US012634939B2

(12) United States Patent
Peng et al.

(10) Patent No.: US 12,634,939 B2
(45) Date of Patent: May 19, 2026

(54) COMMUNICATION METHOD AND APPARATUS, CHIP, STORAGE MEDIUM, AND PROGRAM PRODUCT

(71) Applicant: Huawei Technologies Co., Ltd., Shenzhen (CN)

(72) Inventors: Lan Peng, Shenzhen (CN); Xueru Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 382 days.

(21) Appl. No.: 18/254,097

(22) PCT Filed: Nov. 23, 2021

(86) PCT No.: PCT/CN2021/132483
§ 371 (c)(1),
(2) Date: May 23, 2023

(87) PCT Pub. No.: WO2022/111478
PCT Pub. Date: Jun. 2, 2022

(65) Prior Publication Data
US 2024/0015744 A1 Jan. 11, 2024

(30) Foreign Application Priority Data

Nov. 24, 2020 (CN) ......................... 202011332625.X
Dec. 30, 2020 (CN) ......................... 202011607154.9

(51) Int. Cl.
*H04W 72/20* (2023.01)
*H04W 72/044* (2023.01)

(52) U.S. Cl.
CPC ......... *H04W 72/20* (2023.01); *H04W 72/044* (2013.01)

(58) Field of Classification Search
CPC ............................ H04W 72/044; H04W 72/20
See application file for complete search history.

(56) References Cited

U.S. PATENT DOCUMENTS

| | | | |
|---|---|---|---|
| 2020/0260472 A1 | 8/2020 | Ganesan et al. | |
| 2020/0322024 A1 | 10/2020 | Cheng et al. | |
| 2022/0159674 A1* | 5/2022 | Deng ..................... | H04W 72/23 |
| 2022/0377722 A1* | 11/2022 | Yao ........................ | H04L 5/0055 |

FOREIGN PATENT DOCUMENTS

| | | |
|---|---|---|
| WO | 2020033704 A1 | 2/2020 |
| WO | 2020092939 A1 | 5/2020 |
| WO | 2020153820 A1 | 7/2020 |

* cited by examiner

*Primary Examiner* — Kent Krueger
(74) *Attorney, Agent, or Firm* — Slater Matsil, LLP

(57) ABSTRACT

A first device sends first control information and second control information to a second device. At least one of a first field or a second field in the first control information indicates a format of the first control information and a format of the second control information. A first format of the first control information indicates a time-frequency resource for feeding back a specified message by the second device. A third format of the second control information indicates a redundancy version of the specified message fed back by the second device. When the first control information is in the first format and the second control information is in the third format, the first device receives, on the time-frequency resource, the specified message fed back by the second device.

20 Claims, 5 Drawing Sheets

```
┌─────────┐                                                   ┌─────────┐
│  First  │                                                   │ Second  │
│ device  │                                                   │ device  │
└────┬────┘                                                   └────┬────┘
     │   601: The first device sends first control                 │
     │   information, second control information,                  │
     │   and a data channel to the second device                  │
     │──────────────────────────────────────────────────────────▶│
     │                                                             │
     │                        ┌────────────────────────────────────────────┐
     │                        │ 602: The second device receives the        │
     │                        │ first control information, the second      │
     │                        │ control information, and the data          │
     │                        │ channel that are sent by the first device  │
     │                        └────────────────────────────────────────────┘
     │                                                             │
     │     603: When the second control information is             │
     │     in a first format b, the second device sends, to        │
     │     the first device, a specified message, control          │
     │          information indicating transmission                │
     │     information of the specified message sent by            │
     │     the second device, and control information              │
     │          indicating a redundancy version of the            │
     │     specified message sent by the second device            │
     │◀────────────────────────────────────────────────────────────│
     │                                                             │
┌────┴──────────────────────────────────────────────────┐        │
│  604: When the second control information is in the first│        │
│ format b, the first device receives the specified message,│      │
│    the control information indicating the transmission    │       │
│ information of the specified message sent by the second   │       │
│    device, and the control information indicating the     │       │
│ redundancy version of the specified message sent by the   │       │
│    second device that are sent by the second device       │       │
└────┬──────────────────────────────────────────────────┘        │
     │                                                             │
```

FIG. 6

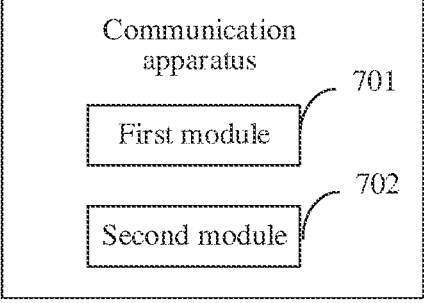

FIG. 7

COMMUNICATION METHOD AND APPARATUS, CHIP, STORAGE MEDIUM, AND PROGRAM PRODUCT

CROSS-REFERENCE TO RELATED APPLICATIONS

This application is a national stage of International Application No. PCT/CN2021/132483, filed on Nov. 23, 2021, which claims priority to Chinese Patent Application No. 202011607154.9, filed on Dec. 30, 2020 and Chinese Patent Application No. 202011332625.X, filed on Nov. 24, 2020. All the aforementioned applications are hereby incorporated by reference in their entireties.

TECHNICAL FIELD

This application relates to the field of communication technologies, and in particular, to a communication method and apparatus, a chip, a storage medium, and a program product.

BACKGROUND

A sidelink (Sidelink, SL) communication technology is an important branch of a cellular Internet of things technology, is a communication technology for direct connection between terminals, and is also referred to as a device to device communication (Device to Device Communication, D2D) technology. The communication technology creates a broad application prospect for Internet of things application. For example, vehicle-to-everything (Vehicle-to-everything, V2X) communication is scenario extension and technology evolution performed based on a sidelink architecture.

Spectrum resources occupied by sidelinks may be classified into two types: a licensed spectrum (Licensed Spectrum) and an unlicensed spectrum (Unlicensed Spectrum). The licensed spectrum is strictly limited and protected, and only a terminal that complies with a specification is allowed to access the licensed spectrum. When a sidelink occupies the licensed spectrum (Licensed Spectrum), coordination with a spectrum resource of a long term evolution (Long Term Evolution, LTE)/new radio (New Radio, NR) network needs to be performed. As a result, a use scenario may be limited, and a rate cannot be further increased. The unlicensed spectrum is open and can be used to improve performance and increase a rate. Because of an unlicensed feature of the unlicensed spectrum, all communication systems can transmit data on the unlicensed spectrum. To ensure fairness and balance performance, and avoid unnecessary interference, a standard defines a technical specification for channel contention, so that a behavior performed by a device when the device occupies the unlicensed spectrum meets an expectation. When occupying the unlicensed spectrum, a terminal needs to perform channel contention to send data. If the channel contention fails, the terminal may have no opportunity to send data.

When a sidelink occupies an unlicensed spectrum (Sidelink Unlicensed, SL-U), the terminal needs to feed back, in a timely manner, many important messages carried on a data channel, to ensure performance of a communication system and effective running of the communication system. However, if channel contention fails, these important messages may not be fed back in a timely manner.

SUMMARY

In view of this, a communication method and apparatus, a chip, a storage medium, and a program product are provided.

According to a first aspect, an embodiment of this application provides a communication method. The method includes: A first device sends first control information and second control information to a second device. The first control information includes at least one of a first field or a second field, the at least one of the first field or the second field indicates a format of the first control information, and the at least one of the first field or the second field indicates a format of the second control information. The format of the first control information includes at least a first format and a second format, the first format indicates a time-frequency resource for feeding back a specified message by the second device, and the second format indicates transmission information of a data channel sent by the first device. The format of the second control information includes at least a third format and a fourth format, the third format indicates a redundancy version of the specified message fed back by the second device, and the fourth format indicates a redundancy version of the data channel sent by the first device. When the first control information is in the first format and the second control information is in the third format, the first device receives, on the time-frequency resource, the specified message fed back by the second device.

Based on the foregoing technical solution, the first device sends the first control information and the second control information to the second device. The first control information includes the at least one of the first field or the second field, the at least one of the first field or the second field indicates the format of the first control information, and the at least one of the first field or the second field indicates the format of the second control information. The first device indicates, based on the first format of the first control information, the time-frequency resource for feeding back the specified message by the second device, indicates, based on the third format of the second control information, the redundancy version of the specified message fed back by the second device, and receives, on the time-frequency resource, the specified message fed back by the second device. In this way, the first device reserves the time-frequency resource for the specified message, to ensure timely and successful feedback of the specified message, so as to improve system performance. In addition, the first device directly receives, on the time-frequency resource, the specified message fed back by the second device, and does not need to blindly detect a time-frequency resource on which the specified message is located or detect control information. This reduces power consumption of the first device.

According to the first aspect, in a first possible implementation of the first aspect, the first format further includes at least one field indicating the time-frequency resource.

Based on the foregoing technical solution, the first format includes the at least one field indicating the time-frequency resource for the specified message, and the first device reserves, by using the field, the time-frequency resource for feeding back the specified message by the second device, to ensure that the specified message can be successfully fed back in a timely manner on the time-frequency resource.

According to the first aspect, in a second possible implementation of the first aspect, the third format further includes at least one field indicating the specified message, where the specified message includes at least one of channel state information (channel state information, CSI), resource selection assistance information, positioning information, or power control assistance information.

Based on the foregoing technical solution, the first format includes the at least one field indicating the specified message, and the first device indicates, by using the field, content of the specified message that the second device needs to feed back, to ensure that the specified message such as the channel state information, the resource selection assistance information, the positioning information, or the power control assistance information can be effectively fed back in a timely manner, so as to improve system performance.

According to the first aspect, in a third possible implementation of the first aspect, the first format further includes at least one field indicating modulation and coding information and demodulation pilot information that are used when the second device feeds back the specified message.

Based on the foregoing technical solution, the first format includes the at least one field indicating the modulation and coding information and the demodulation pilot information that are used when the second device feeds back the specified message, and the first device indicates, by using the field, the second device to feed back the specified message by using the modulation and coding information and the demodulation pilot information, to ensure timely and successful feedback of the specified message.

According to the first aspect, in a fourth possible implementation of the first aspect, the first format further includes at least one field indicating a period in which the second device feeds back the specified message.

Based on the foregoing technical solution, the first format includes the at least one field indicating the period in which the second device feeds back the specified message, and the first device indicates, by using the field, the second device to feed back the specified message based on the period, to ensure effective running of a system.

According to the first aspect, in a fifth possible implementation of the first aspect, the third format further includes all bits of a source identifier of the first control information and the second control information and all bits of a destination identifier of the first control information and the second control information.

Based on the foregoing technical solution, the third format further includes all the bits of the source identifier of the first control information and the second control information and all the bits of the destination identifier of the first control information and the second control information. The first device may clearly indicate the source identifier and the destination identifier of the first control information and the second control information by using the field, to ensure that an object expected by the first device successfully feeds back the specified message in a timely manner.

According to the first aspect, in a sixth possible implementation of the first aspect, the time-frequency resource meets a processing time capability of the second device for the specified message.

Based on the foregoing technical solution, in consideration of the processing time capability of the second device for the specified message, the time-frequency resource reserved by the first device for the second device meets the processing time capability of the second device for the specified message, so that it can be ensured that the second device has time to process the specified message, and successfully feeds back the processed specified message in a timely manner, to ensure effective running of a system.

According to the first aspect or the plurality of possible implementations of the first aspect, in a seventh possible implementation of the first aspect, the first control information or the second control information includes sidelink control information (Sidelink Control Information, SCI), and the data channel includes a physical sidelink shared channel (Physical Sidelink Shared Channel, PSSCH).

Based on the foregoing technical solution, the first control information or the second control information may be the sidelink control information, and the data channel may be the physical sidelink shared channel. To be specific, the first device communicates with the second device through a sidelink. The first device reserves the time-frequency resource for the specified message, to ensure timely and successful feedback of the specified message, so as to improve SL-U communication system performance.

According to a second aspect, an embodiment of this application provides a communication method. The method includes: A second device receives first control information and second control information that are sent by a first device. The first control information includes at least one of a first field or a second field, the at least one of the first field or the second field indicates a format of the first control information, and the at least one of the first field or the second field indicates a format of the second control information. The format of the first control information includes at least a first format and a second format, the first format indicates a time-frequency resource for feeding back a specified message by the second device, and the second format indicates transmission information of a data channel sent by the first device. The format of the second control information includes at least a third format and a fourth format, the third format indicates a redundancy version of the specified message fed back by the second device, and the fourth format indicates a redundancy version of the data channel sent by the first device. When the first control information is in the first format and the second control information is in the third format, the second device feeds back the specified message to the first device on the time-frequency resource.

Based on the foregoing technical solution, the second device receives the first control information and the second control information that are sent by the first device. The first control information includes the at least one of the first field or the second field, the at least one of the first field or the second field indicates the format of the first control information, and the at least one of the first field or the second field indicates the format of the second control information. The first format of the first control information indicates the time-frequency resource for feeding back the specified message by the second device, and the third format of the second control information indicates the redundancy version of the specified message fed back by the second device. When the first control information is in the first format and the second control information is in the third format, the second device feeds back the specified message to the first device on the time-frequency resource. In this way, the second device feeds back the specified message on the reserved time-frequency resource, to ensure timely and successful feedback of the specified message, so as to improve system performance. In addition, when sending the specified message, the second device does not need to select a time-frequency resource through channel contention or send control information. This reduces power consumption of the second device.

According to the second aspect, in a first possible implementation of the second aspect, the first format further includes at least one field indicating the time-frequency resource.

Based on the foregoing technical solution, the first format includes the at least one field indicating the time-frequency resource for the specified message, and the second device determines, by using the field, the time-frequency resource reserved for the specified message, and feeds back the specified message on the time-frequency resource, to ensure timely and successful feedback of the specified message.

According to the second aspect, in a second possible implementation of the second aspect, the third format further includes at least one field indicating the specified message, where the specified message includes at least one of channel state information, resource selection assistance information, positioning information, or power control assistance information.

Based on the foregoing technical solution, the first format includes the at least one field indicating the specified message, and the second device determines, by using the field, content of the specified message that needs to be fed back, to ensure that the specified message such as the channel state information, the resource selection assistance information, the positioning information, or the power control assistance information can be effectively fed back in a timely manner, so as to improve system performance.

According to the second aspect, in a third possible implementation of the second aspect, the first format further includes at least one field indicating modulation and coding information and demodulation pilot information that are used when the second device feeds back the specified message.

Based on the foregoing technical solution, the first format includes the at least one field indicating the modulation and coding information and the demodulation pilot information that are used when the second device feeds back the specified message. The second device determines, by using the field, the modulation and coding information and the demodulation pilot information that are used when the specified message is sent, and feeds back the specified message by using the modulation and coding information and the demodulation pilot information, to ensure timely and successful feedback of the specified message.

According to the second aspect, in a fourth possible implementation of the second aspect, the first format further includes at least one field indicating a period in which the second device feeds back the specified message.

Based on the foregoing technical solution, the first format includes the at least one field indicating the period in which the second device feeds back the specified message. The second device determines, by using the field, the period in which the specified message is fed back, and feeds back the specified message in a timely manner based on the period, to ensure effective running of a system.

According to the second aspect, in a fifth possible implementation of the second aspect, the third format further includes all bits of a source identifier of the first control information and the second control information and all bits of a destination identifier of the first control information and the second control information.

Based on the foregoing technical solution, the third format further includes all the bits of the source identifier of the first control information and the second control information and all the bits of the destination identifier of the first control information and the second control information. The second device may determine the source identifier and the destination identifier of the first control information and the second control information by using the field, to determine that the second device is an object expected by the first device, and successfully feed back the specified message in a timely manner.

According to the fifth possible implementation of the second aspect, in a sixth possible implementation of the second aspect, the method further includes: The second device skips using the time-frequency resource when the destination identifier is different from an identifier of the second device.

Based on the foregoing technical solution, the second device may determine the source identifier and the destination identifier of the first control information and the second control information by using the field, and the second device skips using the time-frequency resource when the destination identifier is different from the identifier of the second device, so that avoidance can be performed on the reserved time-frequency resource, and timely and successful feedback of the specified message on the time-frequency resource is ensured.

According to the second aspect, in a seventh possible implementation of the second aspect, the time-frequency resource meets a processing time capability of the second device for the specified message.

Based on the foregoing technical solution, in consideration of the processing time capability of the second device for the specified message, the reserved time-frequency resource meets the processing time capability of the second device for the specified message, so that it can be ensured that the second device has time to process the specified message, and successfully feeds back the processed specified message in a timely manner, to ensure effective running of a system.

According to a third aspect, an embodiment of this application provides a communication method. The method includes: A first device sends first control information, second control information, and a data channel to a second device, where the first control information indicates transmission information of the data channel sent by the first device, and the first control information includes at least one field indicating a format of the second control information. The format of the second control information includes at least a first format and a second format, the first format indicates a time-frequency resource for feeding back a specified message by the second device, and the second format indicates a redundancy version of the data channel sent by the first device. When the second control information is in the first format, the first device receives the specified message, control information indicating the transmission information of the specified message sent by the second device, and control information indicating the redundancy version of the specified message sent by the second device that are sent by the second device, where the specified message occupies a part or all of the time-frequency resource.

Based on the foregoing technical solution, the first device sends the first control information, the second control information, and the data channel to the second device. The first control information indicates the transmission information of the data channel sent by the first device, and the first control information includes the at least one field indicating the format of the second control information. The first device indicates, based on the first format of the second control information, the time-frequency resource for feeding back the specified message by the second device, and receives the specified message, the control information indicating the transmission information of the specified message sent by the second device, and the control information indicating the redundancy version of the specified message sent by the second device that are sent by the second device, where sixth control information indicates the redundancy version of the specified message sent by the second device, and the specified message occupies the part or all of the time-frequency resource. In this way, the first device reserves the time-frequency resource for the specified message, to ensure timely and successful feedback of the specified message, so as to improve system performance.

According to the third aspect, in a first possible implementation of the third aspect, the first format further includes at least one field indicating the time-frequency resource.

Based on the foregoing technical solution, the first format includes the at least one field indicating the time-frequency resource for the specified message, and the first device reserves, by using the field, the time-frequency resource for feeding back the specified message by the second device, to ensure that the specified message can be successfully fed back in a timely manner on the part or all of the time-frequency resource.

According to the third aspect, in a second possible implementation of the third aspect, the first format further includes at least one field indicating the specified message, where the specified message includes at least one of channel state information, resource selection assistance information, positioning information, or power control assistance information.

Based on the foregoing technical solution, the first format includes the at least one field indicating the specified message, and the first device indicates, by using the field, content of the specified message that the second device needs to feed back, to ensure that the specified message such as the channel state information, the resource selection assistance information, the positioning information, or the power control assistance information can be effectively fed back in a timely manner, so as to improve system performance.

According to the third aspect, in a third possible implementation of the third aspect, the first format further includes at least one field indicating a period in which the second device feeds back the specified message.

Based on the foregoing technical solution, the first format includes the at least one field indicating the period in which the second device feeds back the specified message, and the first device indicates, by using the field, the second device to feed back the specified message based on the period, to ensure effective running of a system.

According to the third aspect, in a fourth possible implementation of the third aspect, the time-frequency resource meets a processing time capability of the second device for the specified message.

Based on the foregoing technical solution, in consideration of the processing time capability of the second device for the specified message, the time-frequency resource reserved by the first device for the second device meets the processing time capability of the second device for the specified message, so that it can be ensured that the second device has time to process the specified message, and successfully feeds back the processed specified message in a timely manner, to ensure effective running of a system.

According to the third aspect, in a fifth possible implementation of the third aspect, the first control information or the second control information includes sidelink control information, and the data channel includes a physical sidelink shared channel.

Based on the foregoing technical solution, the first control information or the second control information may be the sidelink control information, and the data channel may be the physical sidelink shared channel. To be specific, the first device communicates with the second device through a sidelink. The first device reserves the time-frequency resource for the specified message, to ensure timely and successful feedback of the specified message, so as to improve SL-U communication system performance.

According to a fourth aspect, an embodiment of this application provides a communication method. The method includes: A second device receives first control information, second control information, and a data channel that are sent by a first device, where the first control information indicates transmission information of the data channel sent by the first device, and the first control information includes at least one field indicating a format of the second control information. The format of the second control information includes at least a first format and a second format, the first format indicates a time-frequency resource for feeding back a specified message by the second device, and the second format indicates a redundancy version of the data channel sent by the first device. When the second control information is in the first format, the second device sends, to the first device, the specified message, control information indicating the transmission information of the specified message sent by the second device, and control information indicating the redundancy version of the specified message sent by the second device, where the specified message occupies a part or all of the time-frequency resource.

Based on the foregoing technical solution, the second device receives the first control information, the second control information, and the data channel that are sent by the first device. The first control information indicates the transmission information of the data channel sent by the first device, and the first control information includes the at least one field indicating the format of the second control information. The first format of the second control information indicates the time-frequency resource for feeding back the specified message by the second device. When the second control information is in the first format, the second device sends, to the first device, the specified message, the control information indicating the transmission information of the specified message sent by the second device, and the control information indicating the redundancy version of the specified message sent by the second device, where the specified message occupies the part or all of the time-frequency resource. In this way, the second device feeds back the specified message on the part or all of the reserved time-frequency resource, to ensure timely and successful feedback of the specified message, so as to improve system performance. In addition, when sending the specified message, the second device does not need to select a time-frequency resource through channel contention. This reduces power consumption of the second device.

According to the fourth aspect, in a first possible implementation of the fourth aspect, the first format further includes at least one field indicating the time-frequency resource.

Based on the foregoing technical solution, the first format includes the at least one field indicating the time-frequency resource for the specified message, and the second device determines, by using the field, the time-frequency resource reserved for the specified message, and feeds back the specified message on the time-frequency resource, to ensure timely and successful feedback of the specified message.

According to the fourth aspect, in a second possible implementation of the fourth aspect, the first format further includes at least one field indicating the specified message, where the specified message includes at least one of channel state information, resource selection assistance information, positioning information, or power control assistance information.

Based on the foregoing technical solution, the first format includes the at least one field indicating the specified message, and the second device determines, by using the field, content of the specified message that needs to be fed back, to ensure that the specified message such as the channel state information, the resource selection assistance information, the positioning information, or the power control assistance information can be effectively fed back in a timely manner, so as to improve system performance.

According to the fourth aspect, in a third possible implementation of the fourth aspect, the first format further includes at least one field indicating a period in which the second device feeds back the specified message.

Based on the foregoing technical solution, the first format includes the at least one field indicating the period in which the second device feeds back the specified message. The second device determines, by using the field, the period in which the specified message is fed back, and feeds back the specified message in a timely manner based on the period, to ensure effective running of a system.

According to the fourth aspect, in a fourth possible implementation of the fourth aspect, the time-frequency resource meets a processing time capability of the second device for the specified message.

Based on the foregoing technical solution, in consideration of the processing time capability of the second device for the specified message, the reserved time-frequency resource meets the processing time capability of the second device for the specified message, so that it can be ensured that the second device has time to process the specified message, and successfully feeds back the processed specified message in a timely manner, to ensure effective running of a system.

According to a fifth aspect, an embodiment of this application provides a communication apparatus. The apparatus includes: a first module, where the first module is configured to send, by a first device, first control information and second control information to a second device, where the first control information includes at least one of a first field or a second field, the at least one of the first field or the second field indicates a format of the first control information, and the at least one of the first field or the second field indicates a format of the second control information, where the format of the first control information includes at least a first format and a second format, the first format indicates a time-frequency resource for feeding back a specified message by the second device, and the second format indicates transmission information of a data channel sent by the first device; and the format of the second control information includes at least a third format and a fourth format, the third format indicates a redundancy version of the specified message fed back by the second device, and the fourth format indicates a redundancy version of the data channel sent by the first device; and a second module, where the second module is configured to: when the first control information is in the first format and the second control information is in the third format, receive, by the first device on the time-frequency resource, the specified message fed back by the second device.

Based on the foregoing technical solution, the first device sends the first control information and the second control information to the second device. The first control information includes the at least one of the first field or the second field, the at least one of the first field or the second field indicates the format of the first control information, and the at least one of the first field or the second field indicates the format of the second control information. The first device indicates, based on the first format of the first control information, the time-frequency resource for feeding back the specified message by the second device, indicates, based on the third format of the second control information, the redundancy version of the specified message fed back by the second device, and receives, on the time-frequency resource, the specified message fed back by the second device. In this way, the first device reserves the time-frequency resource for the specified message, to ensure timely and successful feedback of the specified message, so as to improve system performance. In addition, the first device directly receives, on the time-frequency resource, the specified message fed back by the second device, and does not need to blindly detect a time-frequency resource on which the specified message is located or detect control information. This reduces power consumption of the first device.

According to the fifth aspect, in a first possible implementation of the fifth aspect, the first format further includes at least one field indicating the time-frequency resource.

Based on the foregoing technical solution, the first format includes the at least one field indicating the time-frequency resource for the specified message, and the first device reserves, by using the field, the time-frequency resource for feeding back the specified message by the second device, to ensure that the specified message can be successfully fed back in a timely manner on the time-frequency resource.

According to the fifth aspect, in a second possible implementation of the fifth aspect, the third format further includes at least one field indicating the specified message, where the specified message includes at least one of channel state information, resource selection assistance information, positioning information, or power control assistance information.

Based on the foregoing technical solution, the first format includes the at least one field indicating the specified message, and the first device indicates, by using the field, content of the specified message that the second device needs to feed back, to ensure that the specified message such as the channel state information, the resource selection assistance information, the positioning information, or the power control assistance information can be effectively fed back in a timely manner, so as to improve system performance.

According to the fifth aspect, in a third possible implementation of the fifth aspect, the first format further includes at least one field indicating modulation and coding information and demodulation pilot information that are used when the second device feeds back the specified message.

Based on the foregoing technical solution, the first format includes the at least one field indicating the modulation and coding information and the demodulation pilot information that are used when the second device feeds back the specified message, and the first device indicates, by using the field, the second device to feed back the specified message by using the modulation and coding information and the demodulation pilot information, to ensure timely and successful feedback of the specified message.

According to the fifth aspect, in a fourth possible implementation of the fifth aspect, the first format further includes at least one field indicating a period in which the second device feeds back the specified message.

Based on the foregoing technical solution, the first format includes the at least one field indicating the period in which the second device feeds back the specified message, and the first device indicates, by using the field, the second device to feed back the specified message based on the period, to ensure effective running of a system.

According to the fifth aspect, in a fifth possible implementation of the fifth aspect, the third format further includes all bits of a source identifier of the first control information and the second control information and all bits of a destination identifier of the first control information and the second control information.

Based on the foregoing technical solution, the third format further includes all the bits of the source identifier of the first control information and the second control information and all the bits of the destination identifier of the first control information and the second control information. The first device may clearly indicate the source identifier and the destination identifier of the first control information and the second control information by using the field, to ensure that an object expected by the first device successfully feeds back the specified message in a timely manner.

According to the fifth aspect, in a sixth possible implementation of the fifth aspect, the time-frequency resource meets a processing time capability of the second device for the specified message.

Based on the foregoing technical solution, in consideration of the processing time capability of the second device for the specified message, the time-frequency resource reserved by the first device for the second device meets the processing time capability of the second device for the specified message, so that it can be ensured that the second device has time to process the specified message, and successfully feeds back the processed specified message in a timely manner, to ensure effective running of a system.

According to the fifth aspect or the plurality of possible implementations of the fifth aspect, in a seventh possible implementation of the first aspect, the first control information or the second control information includes sidelink control information, and the data channel includes a physical sidelink shared channel.

Based on the foregoing technical solution, the first control information or the second control information may be the sidelink control information, and the data channel may be the physical sidelink shared channel. To be specific, the first device communicates with the second device through a sidelink. The first device reserves the time-frequency resource for the specified message, to ensure timely and successful feedback of the specified message, so as to improve SL-U communication system performance.

According to a sixth aspect, an embodiment of this application provides a communication apparatus. The apparatus includes: a first module, where the first module is configured to receive, by a second device, first control information and second control information that are sent by a first device, where the first control information includes at least one of a first field or a second field, the at least one of the first field or the second field indicates a format of the first control information, and the at least one of the first field or the second field indicates a format of the second control information, where the format of the first control information includes at least a first format and a second format, the first format indicates a time-frequency resource for feeding back a specified message by the second device, and the second format indicates transmission information of a data channel sent by the first device; and the format of the second control information includes at least a third format and a fourth format, the third format indicates a redundancy version of the specified message fed back by the second device, and the fourth format indicates a redundancy version of the data channel sent by the first device; and a second module, where the second module is configured to: when the first control information is in the first format and the second control information is in the third format, feed back, by the second device, the specified message to the first device on the time-frequency resource.

Based on the foregoing technical solution, the second device receives the first control information and the second control information that are sent by the first device. The first control information includes the at least one of the first field or the second field, the at least one of the first field or the second field indicates the format of the first control information, and the at least one of the first field or the second field indicates the format of the second control information. The first format of the first control information indicates the time-frequency resource for feeding back the specified message by the second device, and the third format of the second control information indicates the redundancy version of the specified message fed back by the second device. When the first control information is in the first format and the second control information is in the third format, the second device feeds back the specified message to the first device on the time-frequency resource. In this way, the second device feeds back the specified message on the reserved time-frequency resource, to ensure timely and successful feedback of the specified message, so as to improve system performance. In addition, when sending the specified message, the second device does not need to select a time-frequency resource through channel contention or send control information. This reduces power consumption of the second device.

According to the sixth aspect, in a first possible implementation of the sixth aspect, the first format further includes at least one field indicating the time-frequency resource.

Based on the foregoing technical solution, the first format includes the at least one field indicating the time-frequency resource for the specified message, and the second device determines, by using the field, the time-frequency resource reserved for the specified message, and feeds back the specified message on the time-frequency resource, to ensure timely and successful feedback of the specified message.

According to the sixth aspect, in a second possible implementation of the sixth aspect, the third format further includes at least one field indicating the specified message, where the specified message includes at least one of channel state information, resource selection assistance information, positioning information, or power control assistance information.

Based on the foregoing technical solution, the first format includes the at least one field indicating the specified message, and the second device determines, by using the field, content of the specified message that needs to be fed back, to ensure that the specified message such as the channel state information, the resource selection assistance information, the positioning information, or the power control assistance information can be effectively fed back in a timely manner, so as to improve system performance.

According to the sixth aspect, in a third possible implementation of the sixth aspect, the first format further includes at least one field indicating modulation and coding information and demodulation pilot information that are used when the second device feeds back the specified message.

Based on the foregoing technical solution, the first format includes the at least one field indicating the modulation and coding information and the demodulation pilot information that are used when the second device feeds back the specified message. The second device determines, by using the field, the modulation and coding information and the demodulation pilot information that are used when the specified message is sent, and feeds back the specified message by using the modulation and coding information and the demodulation pilot information, to ensure timely and successful feedback of the specified message.

According to the sixth aspect, in a fourth possible implementation of the sixth aspect, the first format further includes at least one field indicating a period in which the second device feeds back the specified message.

Based on the foregoing technical solution, the first format includes the at least one field indicating the period in which the second device feeds back the specified message. The second device determines, by using the field, the period in which the specified message is fed back, and feeds back the specified message in a timely manner based on the period, to ensure effective running of a system.

According to the sixth aspect, in a fifth possible implementation of the sixth aspect, the third format further includes all bits of a source identifier of the first control information and the second control information and all bits of a destination identifier of the first control information and the second control information.

Based on the foregoing technical solution, the third format further includes all the bits of the source identifier of the first control information and the second control information and all the bits of the destination identifier of the first control information and the second control information. The second device may determine the source identifier and the destination identifier of the first control information and the second control information by using the field, to determine that the second device is an object expected by the first device, and successfully feed back the specified message in a timely manner.

According to the fifth possible implementation of the sixth aspect, in a sixth possible implementation of the sixth aspect, the second module is further configured to skip, by the second device, using the time-frequency resource when the destination identifier is different from an identifier of the second device.

Based on the foregoing technical solution, the second device may determine the source identifier and the destination identifier of the first control information and the second control information by using the field, and the second device skips using the time-frequency resource when the destination identifier is different from the identifier of the second device, so that avoidance can be performed on the reserved time-frequency resource, and timely and successful feedback of the specified message on the time-frequency resource is ensured.

According to the sixth aspect, in a seventh possible implementation of the sixth aspect, the time-frequency resource meets a processing time capability of the second device for the specified message.

Based on the foregoing technical solution, in consideration of the processing time capability of the second device for the specified message, the reserved time-frequency resource meets the processing time capability of the second device for the specified message, so that it can be ensured that the second device has time to process the specified message, and successfully feeds back the processed specified message in a timely manner, to ensure effective running of a system.

According to a seventh aspect, an embodiment of this application provides a communication apparatus. The apparatus includes: a first module, where the first module is configured to send, by a first device, first control information, second control information, and a data channel to a second device, where the first control information indicates transmission information of the data channel sent by the first device, and the first control information includes at least one field indicating a format of the second control information, where the format of the second control information includes at least a first format and a second format, the first format indicates a time-frequency resource for feeding back a specified message by the second device, and the second format indicates a redundancy version of the data channel sent by the first device; and a second module, where the second module is configured to: when the second control information is in the first format, receive, by the first device, the specified message, control information indicating the transmission information of the specified message sent by the second device, and control information indicating the redundancy version of the specified message sent by the second device that are sent by the second device, where the specified message occupies a part or all of the time-frequency resource.

Based on the foregoing technical solution, the first device sends the first control information, the second control information, and the data channel to the second device. The first control information indicates the transmission information of the data channel sent by the first device, and the first control information includes the at least one field indicating the format of the second control information. The first device indicates, based on the first format of the second control information, the time-frequency resource for feeding back the specified message by the second device, and receives the specified message, the control information indicating the transmission information of the specified message sent by the second device, and the control information indicating the redundancy version of the specified message sent by the second device that are sent by the second device, where sixth control information indicates the redundancy version of the specified message sent by the second device, and the specified message occupies the part or all of the time-frequency resource. In this way, the first device reserves the time-frequency resource for the specified message, to ensure timely and successful feedback of the specified message, so as to improve system performance.

According to the seventh aspect, in a first possible implementation of the seventh aspect, the first format further includes at least one field indicating the time-frequency resource.

Based on the foregoing technical solution, the first format includes the at least one field indicating the time-frequency resource for the specified message, and the first device reserves, by using the field, the time-frequency resource for feeding back the specified message by the second device, to ensure that the specified message can be successfully fed back in a timely manner on the part or all of the time-frequency resource.

According to the seventh aspect, in a second possible implementation of the seventh aspect, the first format further includes at least one field indicating the specified message, where the specified message includes at least one of channel state information, resource selection assistance information, positioning information, or power control assistance information.

Based on the foregoing technical solution, the first format includes the at least one field indicating the specified message, and the first device indicates, by using the field, content of the specified message that the second device needs to feed back, to ensure that the specified message such as the channel state information, the resource selection assistance information, the positioning information, or the power control assistance information can be effectively fed back in a timely manner, so as to improve system performance.

According to the seventh aspect, in a third possible implementation of the seventh aspect, the first format further includes at least one field indicating a period in which the second device feeds back the specified message.

Based on the foregoing technical solution, the first format includes the at least one field indicating the period in which the second device feeds back the specified message, and the first device indicates, by using the field, the second device to feed back the specified message based on the period, to ensure effective running of a system.

According to the seventh aspect, in a fourth possible implementation of the seventh aspect, the time-frequency resource meets a processing time capability of the second device for the specified message.

Based on the foregoing technical solution, in consideration of the processing time capability of the second device for the specified message, the time-frequency resource reserved by the first device for the second device meets the processing time capability of the second device for the specified message, so that it can be ensured that the second device has time to process the specified message, and successfully feeds back the processed specified message in a timely manner, to ensure effective running of a system.

According to the seventh aspect, in a fifth possible implementation of the seventh aspect, the first control information or the second control information includes sidelink control information, and the data channel includes a physical sidelink shared channel.

Based on the foregoing technical solution, the first control information or the second control information may be the sidelink control information, and the data channel may be the physical sidelink shared channel. To be specific, the first device communicates with the second device through a sidelink. The first device reserves the time-frequency resource for the specified message, to ensure timely and successful feedback of the specified message, so as to improve SL-U communication system performance.

According to an eighth aspect, an embodiment of this application provides a communication apparatus. The apparatus includes: a first module, where the first module is configured to receive, by a second device, first control information, second control information, and a data channel that are sent by a first device, where the first control information indicates transmission information of the data channel sent by the first device, and the first control information includes at least one field indicating a format of the second control information, where the format of the second control information includes at least a first format and a second format, the first format indicates a time-frequency resource for feeding back a specified message by the second device, and the second format indicates a redundancy version of the data channel sent by the first device; and a second module, where the second module is configured to: when the second control information is in the first format, send, by the second device to the first device, the specified message, control information indicating the transmission information of the specified message sent by the second device, and control information indicating the redundancy version of the specified message sent by the second device, where the specified message occupies a part or all of the time-frequency resource.

Based on the foregoing technical solution, the second device receives the first control information, the second control information, and the data channel that are sent by the first device, where the first control information indicates the transmission information of the data channel sent by the first device, and the first control information includes the at least one field indicating the format of the second control information. The first format of the second control information indicates the time-frequency resource for feeding back the specified message by the second device. When the second control information is in the first format, the second device sends, to the first device, the specified message, the control information indicating the transmission information of the specified message sent by the second device, and the control information indicating the redundancy version of the specified message sent by the second device, where the specified message occupies the part or all of the time-frequency resource. In this way, the second device feeds back the specified message on the part or all of the reserved time-frequency resource, to ensure timely and successful feedback of the specified message, so as to improve system performance. In addition, when sending the specified message, the second device does not need to select a time-frequency resource through channel contention. This reduces power consumption of the second device.

According to the eighth aspect, in a first possible implementation of the eighth aspect, the first format further includes at least one field indicating the time-frequency resource.

Based on the foregoing technical solution, the first format includes the at least one field indicating the time-frequency resource for the specified message, and the second device determines, by using the field, the time-frequency resource reserved for the specified message, and feeds back the specified message on the time-frequency resource, to ensure timely and successful feedback of the specified message.

According to the eighth aspect, in a second possible implementation of the eighth aspect, the first format further includes at least one field indicating the specified message, where the specified message includes at least one of channel state information, resource selection assistance information, positioning information, or power control assistance information.

Based on the foregoing technical solution, the first format includes the at least one field indicating the specified message, and the second device determines, by using the field, content of the specified message that needs to be fed back, to ensure that the specified message such as the channel state information, the resource selection assistance information, the positioning information, or the power control assistance information can be effectively fed back in a timely manner, so as to improve system performance.

According to the eighth aspect, in a third possible implementation of the eighth aspect, the first format further includes at least one field indicating a period in which the second device feeds back the specified message.

Based on the foregoing technical solution, the first format includes the at least one field indicating the period in which the second device feeds back the specified message. The second device determines, by using the field, the period in which the specified message is fed back, and feeds back the specified message in a timely manner based on the period, to ensure effective running of a system.

According to the eighth aspect, in a fourth possible implementation of the eighth aspect, the time-frequency resource meets a processing time capability of the second device for the specified message.

Based on the foregoing technical solution, in consideration of the processing time capability of the second device for the specified message, the reserved time-frequency resource meets the processing time capability of the second device for the specified message, so that it can be ensured that the second device has time to process the specified message, and successfully feeds back the processed specified message in a timely manner, to ensure effective running of a system.

According to a ninth aspect, an embodiment of this application provides a communication apparatus, including a processor; and a memory configured to store instructions executable by the processor. The processor is configured to: when executing the instructions, implement the communication method in the first aspect or one or more of the plurality of possible implementations of the first aspect, or implement the communication method in the second aspect or one or more of the plurality of possible implementations of the second aspect, or implement the communication method in the third aspect or one or more of the plurality of possible implementations of the third aspect, or implement the communication method in the fourth aspect or one or more of the plurality of possible implementations of the fourth aspect.

Based on the foregoing technical solution, the first device reserves the time-frequency resource for the specified message, to ensure that the second device successfully feeds back the specified message in a timely manner, so as to improve system performance.

According to a tenth aspect, an embodiment of this application provides a non-volatile computer-readable storage medium, storing computer program instructions. When the computer program instructions are executed by a processor, the communication method in the first aspect or one or more of the plurality of possible implementations of the first aspect is implemented, or the communication method in the second aspect or one or more of the plurality of possible implementations of the second aspect is implemented, or the communication method in the third aspect or one or more of the plurality of possible implementations of the third aspect is implemented, or the communication method in the fourth aspect or one or more of the plurality of possible implementations of the fourth aspect is implemented.

Based on the foregoing technical solution, the first device reserves the time-frequency resource for the specified message, to ensure that the second device successfully feeds back the specified message in a timely manner, so as to improve system performance.

According to a tenth aspect, an embodiment of this application provides a chip, including a processor. When the processor executes instructions, the processor performs the communication method in the first aspect or one or more of the plurality of possible implementations of the first aspect, or performs the communication method in the second aspect or one or more of the plurality of possible implementations of the second aspect, or performs the communication method in the third aspect or one or more of the plurality of possible implementations of the third aspect, or performs the communication method in the fourth aspect or one or more of the plurality of possible implementations of the fourth aspect.

Based on the foregoing technical solution, the first device reserves the time-frequency resource for the specified message, to ensure that the second device successfully feeds back the specified message in a timely manner, so as to improve system performance.

According to an eleventh aspect, an embodiment of this application provides a computer program product including instructions. When the computer program product runs on a computer, the computer is enabled to perform the communication method in the first aspect or one or more of the plurality of possible implementations of the first aspect, or perform the communication method in the second aspect or one or more of the plurality of possible implementations of the second aspect, or perform the communication method in the third aspect or one or more of the plurality of possible implementations of the third aspect, or perform the communication method in the fourth aspect or one or more of the plurality of possible implementations of the fourth aspect.

Based on the foregoing technical solution, the first device reserves the time-frequency resource for the specified message, to ensure that the second device successfully feeds back the specified message in a timely manner, so as to improve system performance.

These aspects and other aspects of this application are more concise and more comprehensive in descriptions of the following (a plurality of) embodiments.

BRIEF DESCRIPTION OF THE DRAWINGS

The accompanying drawings included in this specification and constituting a part of this specification and this specification jointly show example embodiments, features, and aspects of this application, and are intended to explain principles of this application.

FIG. 6 is a flowchart of another communication method according to an embodiment of this application;

FIG. 7 is a structural diagram of a communication apparatus according to an embodiment of this application;

DETAILED DESCRIPTION OF ILLUSTRATIVE EMBODIMENTS

Figure 1:
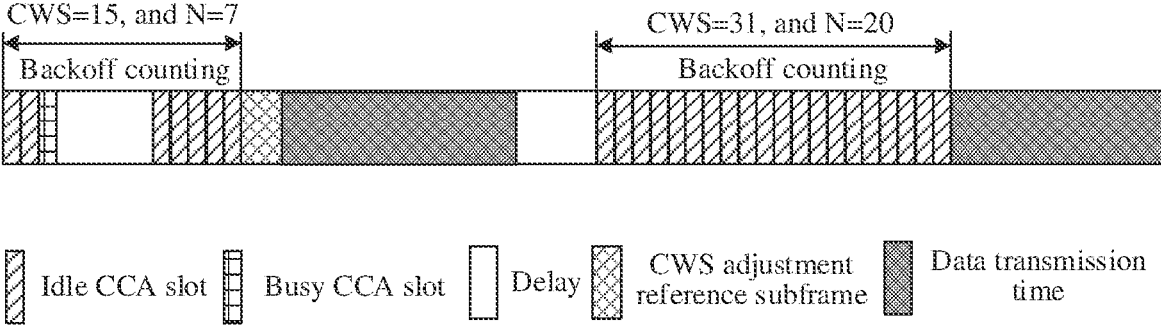
FIG. 1 is a schematic diagram of a full LBT mechanism according to an embodiment of this application.

The following describes various example embodiments, features, and aspects of this application in detail with reference to the accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, an embodiment, or an illustration". Any embodiment described as an "example" is not necessarily explained as being superior or better than other embodiments.

In addition, to better describe this application, numerous specific details are provided in the following specific implementations. A person skilled in the art should understand that this application can also be implemented without some specific details. In some embodiments, methods, means, elements, and circuits that are well-known to a person skilled in the art are not described in detail, so that the subject matter of this application is highlighted.

The following describes a channel contention mechanism on an unlicensed spectrum.

When sending data on the unlicensed spectrum, a terminal needs to perform channel contention before sending the data. A basic process is as follows: Before each time of sending, the terminal first monitors whether a channel is idle. If the channel is not idle, the terminal does not send the data, but waits for a while and then attempts to send the data. In this way, the terminal sends the data only when it is ensured that the channel is idle, to avoid interruption of a data transmission process that is currently performed by another terminal.

Common channel contention on the unlicensed spectrum includes listen before talk (Listen Before Talk, LBT) and carrier sense multiple access (Carrier Sensing Multiple Access, CSMA). The following uses an LBT mechanism in NR-U (New Radio Unlicensed) as an example to describe a channel contention procedure on the unlicensed spectrum.

LBT mechanisms may include full LBT (full LBT), one-shot LBT (one-shot LBT), and no LBT (no LBT). A full LBT process of the terminal is as follows:

(a) The terminal initializes a backoff count counter (Backoff countdown) and randomly generates a number N satisfying that 0<N<backoff time window size (contention window size, CWS), where the CWS is a window length constrained based on a service priority.

(b) The terminal performs clear channel assessment (clear channel assessment, CCA) detection. If it is detected (sensed) that a current slot (slot) is an idle CCA slot (idle CCA slot), N=N−1. If it is detected (sensed) that a current slot (slot) is a busy CCA slot (busy CCA slot), the terminal performs self-deferring (self-deferring) and stops counting of the foregoing counter until the slot becomes an idle CCA slot.

(c) If the count N of the counter is equal to 0, the terminal may start to perform data transmission.

FIG. 1 is a schematic diagram of a full LBT mechanism according to an embodiment of this application. As shown in FIG. 1, a terminal performs full LBT twice. In the first full LBT process, a CWS=15, and N=7 is randomly generated. The terminal detects that the first two slots are idle CCA slots and detects that the 3rd slot is a busy CCA slot. In this case, self-deferring is performed. A time delay may be one or more slots. Counting is stopped during the self-deferring. When a channel is idle, counting continues until five idle CCA slots are continuously detected. In this case, N=0, and the terminal starts to perform data transmission. In the second full LBT process, a CWS=31, and N=20 is randomly generated. If the terminal continuously detects that 20 slots are idle CCA slots, that is, N=0, the terminal starts to perform data transmission.

According to the foregoing descriptions, the terminal needs to perform LBT before occupying an unlicensed spectrum to send data. Consequently, the terminal may have no opportunity to send data or cannot send data in a timely manner due to an LBT failure.

For an SL-U communication system, a hybrid automatic repeat request (Hybrid Automatic Repeat Request, HARQ) feedback message is carried on a sidelink physical feedback channel (Physical Sidelink Feedback Channel, PSFCH), SCI is carried on a sidelink physical control channel (physical sidelink control channel, PSCCH), and transmitted data is carried on a PSSCH. A sending terminal (TxUE) sends control information and data to a receiving terminal (RxUE), and the receiving terminal sends a HARQ feedback message for the received data carried on the PSSCH. The HARQ feedback message is carried on the PSFCH. Because there is a one-to-one binding relationship between the PSFCH and the PSSCH, the HARQ feedback message can be directly fed back to the sending terminal without channel contention. However, feedback information such as channel measurement information is carried on the PSSCH; in this case, the receiving terminal can determine, only after channel contention, whether the feedback information can be fed back to the sending terminal.

In the SL-U, the receiving terminal has many important feedback messages, for example, 31 measurement information: channel quality information (Channel Quantity Indicator, CQI), rank information (Rank Indicator, RI), and precoding matrix indication information (Precoding Matrix Indicator, PMI); resource selection assistance information for the terminal, for example, information for assisting a group header in resource selection by a group member (Group Member) in a group (Group) mechanism and receive end assistance information in a receive end-assisted resource allocation mode (Mode2b); positioning information; and power control assistance information. The feedback information is carried on the PSSCH, and needs to be fed back to the sending terminal, the group header (Group Header), or the like in a timely manner, to ensure performance of the communication system and effective running of the communication system.

Figure 2:
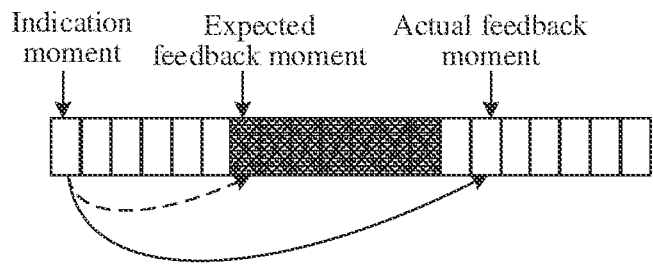
FIG. 2 is a schematic diagram of delayed data transmission caused by a channel contention failure according to an embodiment of this application.

FIG. 2 is a schematic diagram of delayed data transmission caused by a channel contention failure according to an embodiment of this application. As shown in FIG. 2, a moment at which a sending terminal or the like sends related indication information such as measurement information, assistance mechanism information, and data transmission information to a receiving terminal is the $1^{st}$ time unit, and corresponding feedback information of the receiving terminal is expected to be received in the $7^{th}$ time unit. However, due to a channel contention failure of the receiving terminal, an actual feedback moment is the $15^{th}$ time unit, that is, there is a long delay from an expected feedback moment to the actual feedback moment, and consequently, these important messages cannot be fed back in a timely manner, and transmission performance of an SL-U communication system and effective running of the communication system are affected.

To resolve the foregoing technical problem, embodiments of this application provide the following technical solutions. For specific content of the technical solutions, refer to the following descriptions.

The technical solutions provided in embodiments of this application may be applied to various communication systems, for example, a new radio (new radio, NR) communication system using a 5th generation (5th generation, 5G) communication technology, a future evolved system, or a plurality of convergent communication systems. The technical solutions provided in this application may be applied to a plurality of application scenarios, for example, scenarios such as machine to machine (machine to machine, M2M), macro-micro communication, enhanced mobile broadband (enhanced mobile broadband, eMBB), ultra-reliable and ultra-low latency communication (ultra-reliable & low-latency communication, uRLLC), massive machine type communication (massive machine type communication, mMTC), and device to device communication (Device to Device Communication, D2D). These scenarios may include but are not limited to: a scenario of communication between terminals, a scenario of communication between network devices, a scenario of communication between a network device and a terminal, and the like. The following uses an example in which this application is applied to the scenario (for example, D2D) of communication between terminals for description.

It should be noted that the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of a network architecture and emergence of new service scenarios, the technical solutions provided in embodiments of this application are also applicable to similar technical problems.

Figure 3:
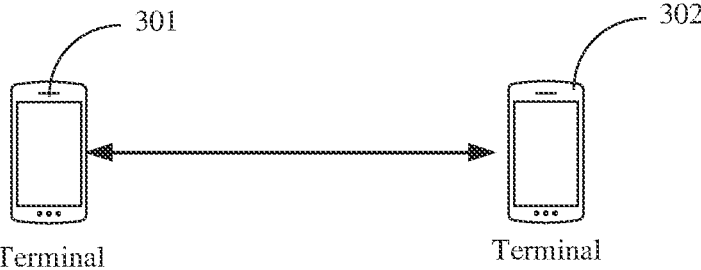
FIG. 3 is a schematic structural diagram of a communication system according to an embodiment of this application.

FIG. 3 is a schematic structural diagram of a communication system according to an embodiment of this application. As shown in FIG. 3, the communication system may include one or more terminals 301 (where only one terminal 301 is shown in FIG. 3) and one or more terminals 302 (where only one terminal 302 is shown in FIG. 3). All the terminals have an SL-U transmission capability, that is, the terminals may communicate with each other through a sidelink, and may occupy an unlicensed spectrum during communication. For example, the terminal 301 and the terminal 302 may perform unicast communication, broadcast communication, or multicast communication through a sidelink. In one time of service communication, a terminal that sends control information and/or data may be referred to as a sending terminal, and a terminal that receives the control information and/or the data may be referred to as a receiving terminal.

Figure 4:
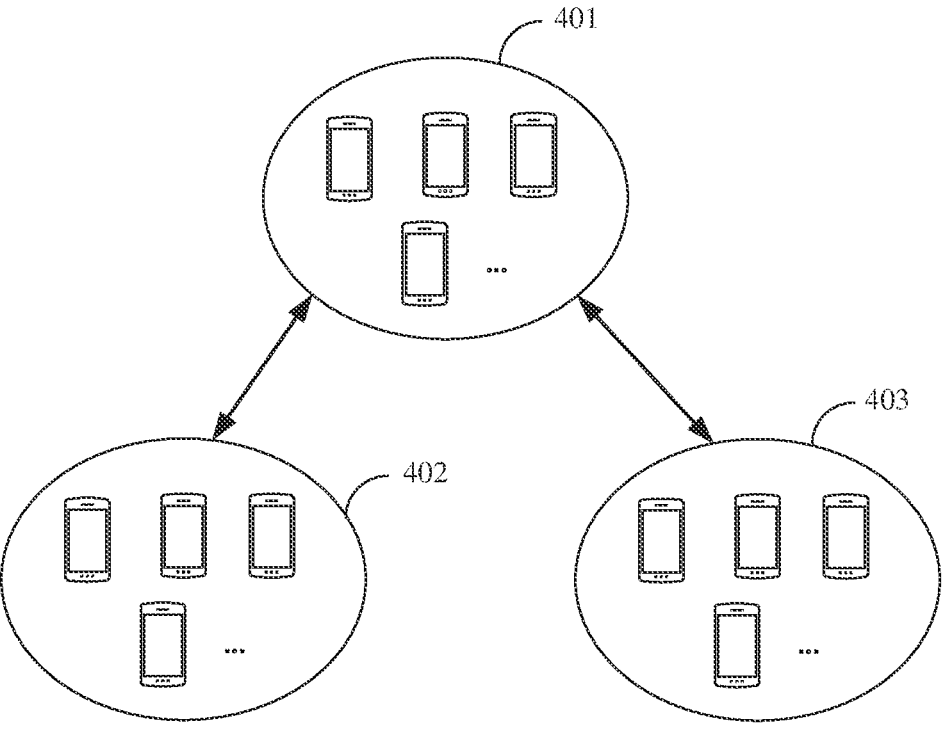
FIG. 4 is a schematic structural diagram of another communication system according to an embodiment of this application.

FIG. 4 is a schematic structural diagram of another communication system according to an embodiment of this application. As shown in FIG. 4, the communication system may include one or more sending terminal groups (where only one sending terminal group 401 is shown in FIG. 4) and one or more receiving terminal groups (where a receiving terminal group 402 and a receiving terminal group 403 are shown in FIG. 4). The sending terminal group 401 may include one or more sending terminals, and the receiving terminal group 402 includes one or more receiving terminals. At least one terminal in the sending terminal group and at least one terminal in the receiving terminal group have an SL-U transmission capability.

For example, the terminal in embodiments of this application may be a device or a component in the device that implements a function of the terminal. For example, the terminal includes but is not limited to various handheld devices, vehicle-mounted devices, wearable devices, or computing devices that have a wireless communication function, or another processing device connected to a wireless modem; and may further include a subscriber unit (subscriber unit), a cellular phone (cellular phone), a smartphone (smartphone), a wireless data card, a personal digital assistant (personal digital assistant, PDA), a computer, or a tablet computer, a handheld (handheld) device, a laptop computer (laptop computer), a machine type communication (machine type communication, MTC) terminal (terminal), user equipment (user equipment, UE), a mobile terminal, a band, a smartwatch, a sensor, and the like. For another example, the terminal may be a component in any one of the foregoing devices (for example, the terminal may be a chip system in any one of the foregoing devices). Alternatively, the terminal in embodiments of this application may be a vehicle-mounted module, a vehicle-mounted assembly, a vehicle-mounted component, a vehicle-mounted chip, or a vehicle-mounted unit that is built in a vehicle as one or more components or units. The vehicle may implement a method in this application by using the vehicle-mounted module, the vehicle-mounted assembly, the vehicle-mounted component, the vehicle-mounted chip, or the vehicle-mounted unit.

The following describes in detail a communication method provided in embodiments of this application with reference to FIG. 3 and FIG. 4.

Figure 5:
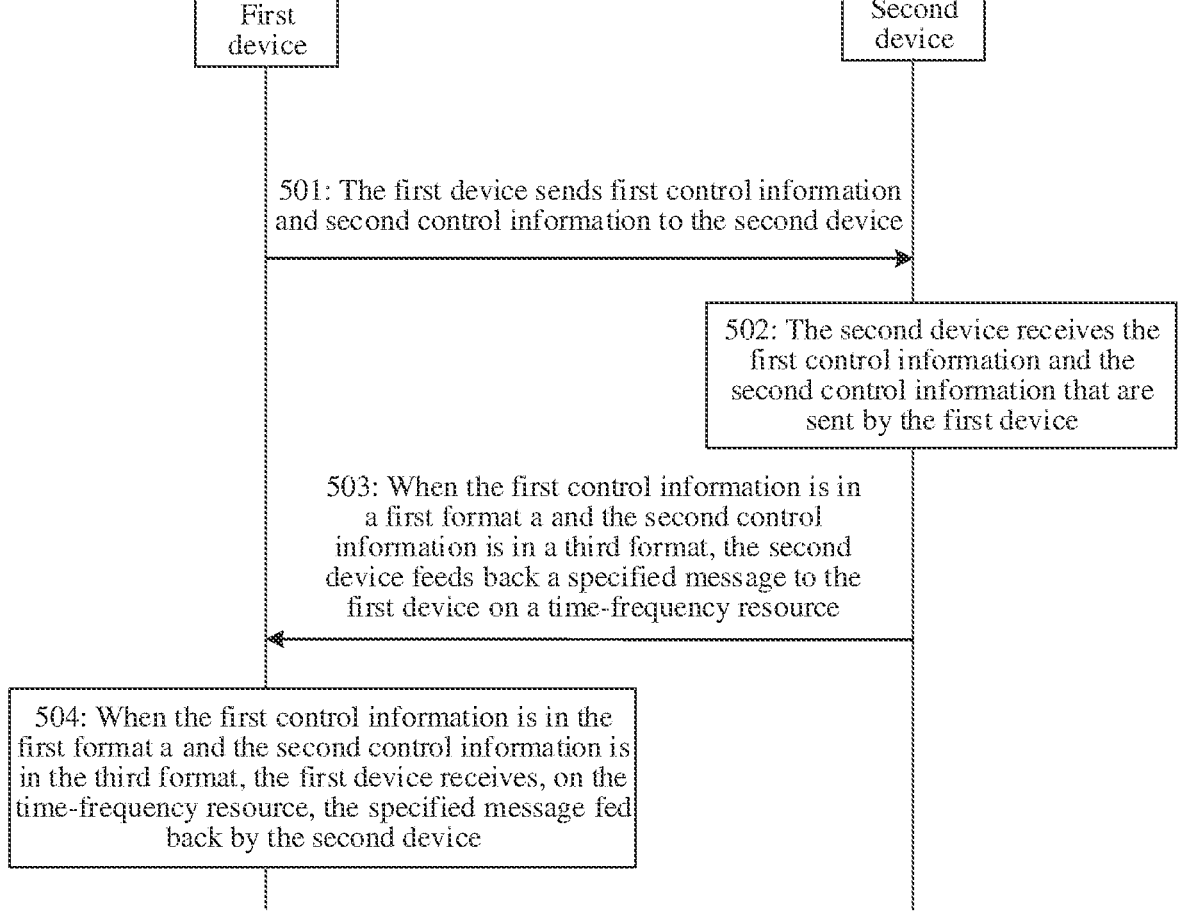
FIG. 5 is a flowchart of a communication method according to an embodiment of this application.

FIG. 5 is a flowchart of a communication method according to an embodiment of this application. The method may be applied to the communication system in FIG. 3 or FIG. 4. A first device may be the terminal 301 in FIG. 3, and correspondingly, a second device may be the terminal 302 in FIG. 3. Alternatively, a first device may be the sending terminal in the sending terminal group 401 in FIG. 4, and correspondingly, a second device may be the receiving terminal in the receiving terminal group 402 and/or the receiving terminal in the receiving terminal group 403 in FIG. 4. As shown in FIG. 5, the method may include the following steps.

Step 501: The first device sends first control information and second control information to the second device.

For example, the first device may send the first control information and the second control information in a multicast, unicast, or broadcast manner. For example, the first device may send the first control information and the second control information to one second device (a unicast scenario), or the first device may send the first control information and the second control information to a plurality of second devices (a multicast scenario), or the first device may send the first control information and the second control information to an unlimited quantity of second devices (a broadcast scenario).

The first control information may include at least one of a first field or a second field, the at least one of the first field or the second field indicates a format of the first control information, and the at least one of the first field or the second field indicates a format of the second control information.

For example, the first control information may include both a first field and a second field, and the first field and the second field jointly indicate the format of the first control information and the format of the second control information. For example, the first field indicates the format of the first control information, and the second field indicates the format of the second control information. Alternatively, the first field indicates the format of the second control information, and the second field indicates the format of the first control information.

For example, the first control information may include only the first field, or the first control information may include only the second field, and the first field (or the second field) separately indicates the format of the first control information and the format of the second control information. For example, the first field indicates the format of the first control information and the format of the second control information, or the second field indicates the format of the first control information and the format of the second control information.

The format of the first control information includes at least a first format a and a second format a. The first format a indicates a time-frequency resource for feeding back a specified message by the second device, and the second format a indicates transmission information of a data channel sent by the first device. Optionally, the first control information may be SCI. In an existing standard protocol, SCI formats include first-stage SCI1 and second-stage SCI2. SCI1 includes SCI1-A, and SCI2 includes SCI2-A and SCI2-B. For fields included in SCI1-A and definitions of the fields, refer to Table 1. For fields included in SCI2-A and definitions of the fields, refer to Table 2. For example, the second format a may be the existing first-stage SCI1, for example, SCI1-A in the foregoing standard protocol. The first format a may be new first-stage SCI1. To distinguish from SCI1-A in the standard protocol, the new first-stage SCI1 is defined as SCI1-B in this embodiment of this application. SCI1-B may reuse at least one field in SCI1-A, and information indicated by each reused field is redefined.

For example, the specified message may include information such as channel state information, resource selection assistance information, positioning information, or power control assistance information carried on a PSSCH.

The channel state information may include information such as a CQI, an RI, and a PMI.

The positioning information may be a location of the second device, for example, may be round trip time (Round Trip Time, RTT) and/or angle of arrival (Angle of Arrival, AoA) information determined by the second device based on a reference signal sent by the first device. Alternatively, the positioning information may be a geographical location of the second device. The geographical location of the second device may be location coordinates obtained based on a satellite, for example, global positioning system coordinates, or BeiDou location coordinates. Alternatively, the location of the second device may be location information obtained based on another positioning system or positioning technology, for example, location information obtained based on inertial navigation, location information obtained based on a radar, or location information obtained based on a positioning signal between the first device and the second device. This is not limited in this embodiment of this application.

The resource selection assistance information may be resource information recommended by a group member to a group header in a group mechanism, to assist the group header in better selecting, for a group, a resource to be used by the group. Alternatively, the resource selection assistance information may be assistance resource information in a sidelink Mode2b resource selection mode. For better communication, the receiving terminal recommends resource information to the sending terminal.

The power control assistance information may be related information measured and fed back by a terminal in a distributed network according to a power control criterion, and includes channel information, interference information, and the like.

For example, the time-frequency resource may include a time domain resource and a frequency domain resource. For example, the frequency domain resource may be one or more resource blocks (resource blocks, RBs), one or more resource elements (resource elements, REs), one or more carriers (carriers), or one or more bandwidth parts (bandwidth parts, BWPs). The time domain resource may be one or more subframes, one or more slots, one or more symbols in one or more slots, or the like.

For example, the data channel may be the PSSCH. The transmission information may include information related to transmission of the data channel, for example, information such as a demodulation reference signal (Demodulation Reference Signal, DMRS), a modulation and coding scheme (Modulation and Coding Scheme, MCS), antenna port information, a time-frequency resource, and a frequency domain resource.

The format of the second control information includes at least a third format and a fourth format. The third format indicates a redundancy version (Redundancy Version, RV) for feeding back the specified message by the second device. The fourth format indicates a redundancy version of the data channel (also referred to as data information) sent by the first device. Optionally, the second control information may be SCI. For example, the fourth format may be the existing second-stage SCI2, for example, may be SCI2-A or SCI2-B in the second-stage SCI2 in the standard protocol. For ease of description, in this embodiment of this application, an example in which the fourth format is SCI2-A in the standard protocol is used for description. The third format may be new second-stage SM. To distinguish from SCI2-A and SCI2-B in the standard protocol, the new second-stage SCI2 is defined as SCI2-C in this embodiment of this application. SCI2-C may reuse at least one field in SCI2-A, and information indicated by each reused field is redefined.

For example, SCI2-C reuses a Redundancy version field in SCI2-A, and the Redundancy version field in SCI2-C indicates the redundancy version of the specified message fed back by the second device. In this way, SCI2-C reuses the Redundancy version field in SCI2-A, so that there is no additional increase in PSCCH signaling overheads, and system transmission performance is ensured.

The following describes, by using examples, manners of indicating the format of the first control information and the format of the second control information.

Manner 1: When the first control information includes both the first field and the second field, the format of the first control information may be indicated by using different values of the first field, and the format of the second control information may be indicated by using different values of the second field. For example, one bit (bit) or two bits in the first field may indicate the format of the first control information. For example, when a value of the one bit is 0, it indicates that the format of the first control information is the first format a; or when a value of the one bit is 1, it indicates that the format of the first control information is the second format a. Alternatively, when a value of the one bit is 1, it indicates that the format of the first control information is the first format a; or when a value of the one bit is 0, it indicates that the format of the first control information is the second format a. Alternatively, when a value of the two bits is 00, it indicates that the first control information is in the second format a; or when a value of the two bits is 11 (or 10 or 01), it indicates that the first control information is in the first format a. For another example, one bit or two bits in the second field may indicate the format of the second control information. For example, when a value of the one bit is 0, it indicates that the format of the second control information is the third format; or when a value of the one bit is 1, it indicates that the format of the second control information is the fourth format. Alternatively, when a value of the one bit is 1, it indicates that the format of the second control information is the third format; or when a value of the one bit is 0, it indicates that the format of the second control information is the fourth format. Alternatively, when a value of the two bits is 00 (or 01), it indicates that the second control information is in the fourth format; or when a value of the two bits is 10 (or 11), it indicates that the second control information is in the third format. In an example, the first field may be a Reserved (reserved bit) field in SCI1-A and SCI1-B, and one bit or two bits in the Reserved field indicate the format of the first control information. For example, when a value of the two bits is 00, it indicates that the first control information is SCI1-A; or when a value of the two bits is 11, it indicates that the first control information is SCI1-B. Alternatively, when a value of the one bit is 0, it indicates that the first control information is SCI1-A; or when a value of the one bit is 1, it indicates that the first control information is SCI1-B. Alternatively, when a value of the one bit is 1, it indicates that the first control information is SCI1-A; or when a value of the one bit is 0, it indicates that the first control information is SCI1-B. The second field may be a 2nd-stage SCI format (second-stage SCI format) field in SCI1-A and SCI1-B. One bit or two bits in the 2nd-stage SCI format field indicate the format of the second control information. For example, when a value of the two bits is 00, it indicates that the second control information is SCI2-A; or when a value of the two bits is 11, it indicates that the second control information is SCI2-C. Alternatively, when a value of the one bit is 0, it indicates that the second control information is SCI2-A; or when a value of the one bit is 1, it indicates that the second control information is SCI2-C.

In this manner, the Reserved field and the 2nd-stage SCI format field in the SCI format in the standard protocol are modified, so that the one bit or the two bits in the Reserved field indicate the format of the first control information, and the one bit or the two bits in the 2nd-stage SCI format field indicate the format of the second control information. In this way, a field in the SCI format in the standard protocol is reused, so that there is no additional increase in PSCCH signaling overheads, and system transmission performance is ensured.

Manner 2: When the first control information includes only the first field (or the first control information includes only the second field), different values of the first field (or the second field) may indicate the format of the first control information and the format of the second control information. For example, two bits in the first field (or the second field) indicate the format of the first control information and the format of the second control information. When a value of the two bits is 00, it indicates that the format of the first control information is the first format a and the format of the second control information is the third format. When a value of the two bits is 01, it indicates that the format of the first control information is the first format a and the format of the second control information is the fourth format. When a value of the two bits is 10, it indicates that the format of the first control information is the second format a and the format of the second control information is the third format. When a value of the two bits is 11, it indicates that the format of the first control information is the second format a and the format of the second control information is the fourth format.

For another example, one bit in the first field (or the second field) indicates the format of the first control information and the format of the second control information. When a value of the one bit is 0, it indicates that the format of the first control information is the first format a and the format of the second control information is the third format; or when a value of the one bit is 1, it indicates that the format of the first control information is the second format a and the format of the second control information is the fourth format. Alternatively, when a value of the one bit is 1, it indicates that the format of the first control information is the first format a and the format of the second control information is the third format; or when a value of the one bit is 0, it indicates that the format of the first control information is the second format a and the format of the second control information is the fourth format.

In an example, the first field may be a Reserved field (or a 2nd-stage SCI format field) in SCI1-A and SCI1-B. Two bits in the Reserved field (or the 2nd-stage SCI format field) indicate the format of the first control information and the format of the second control information. For example, when a value of the two bits is 11, it indicates that the first control information is SCI1-B and the second control information is SCI2-C. When a value of the two bits is 01, it indicates that the format of the first control information is SCI1-B and the format of the second control information is SCI2-A. When a value of the two bits is 10, it indicates that the format of the first control information is SCI1-A and the format of the second control information is SCI2-C. When a value of the two bits is 00, it indicates that the format of the first control information is SCI1-A and the format of the second control information is SCI2-A.

In an example, the first field may be a Reserved field (or a 2nd-stage SCI format field) in SCI1-A and SCI1-B. One bit in the Reserved field (or 2nd-stage SCI format field) indicates the format of the first control information and the format of the second control information. For example, when a value of the one bit is 0, it indicates that the first control information is SCI1-B and the second control information is SCI2-C; or when a value of the one bit is 1, it indicates that the format of the first control information is SCI1-A and the format of the second control information is SCI2-A. Alternatively, when a value of the one bit is 1, it indicates that the first control information is SCI1-B and the second control information is SCI2-C; or when a value of one bit is 0, it indicates that the format of the first control information is SCI1-A and the format of the second control information is SCI2-A.

In this manner, the Reserved field (or the 2nd-stage SCI format field) in the SCI format in the standard protocol is modified, so that the two bits or the one bit in the Reserved field (or the 2nd-stage SCI format) indicates the format of the first control information and the format of the second control information. In this way, only one field in the SCI format in the standard protocol is reused, so that there is no additional increase in PSCCH signaling overheads, and system transmission performance is ensured.

The following describes other fields that may be included in the first control information or the second control information.

In a possible implementation, the first format a may further include at least one field indicating the time-frequency resource. In this way, the first device reserves, by using the at least one field, the time-frequency resource for feeding back the specified message by the second device, to ensure that the specified message can be successfully fed back in a timely manner on the time-frequency resource.

It should be noted that the reserved time domain resource does not need to be continuously occupied for long time, but only a small part of time-frequency patterns are reserved to meet a requirement for feeding back the specified message, to achieve optimal performance with as low overheads as possible.

For example, two fields in the first format a indicate the time-frequency resource reserved for the specified message, one of the two fields may indicate a time domain resource reserved for the specified message, and the other may indicate a reserved frequency domain resource. Alternatively, one field in the first format a indicates the time-frequency resource reserved for the specified message, and the field may indicate both a time domain resource reserved for the specified message and a frequency domain resource reserved for the specified message. It may be understood that three or more fields in the first format a may indicate the time-frequency resource. A quantity of fields indicating the time-frequency resource is not limited in this embodiment of this application.

In an example, SCI1-B reuses a Frequency resource assignment (frequency domain resource assignment) field and a Time resource assignment (time domain resource assignment) field in SCI1-A. The Frequency resource assignment field and the Time resource assignment field in SCI1-B indicate the time-frequency resource reserved for the specified message. The Frequency resource assignment field indicates a reserved frequency domain resource, and the Time resource assignment field indicates a reserved time domain resource. In this way, the Frequency resource assignment field and the Time resource assignment field in SCI1-A are reused, so that there is no additional increase in PSCCH signaling overheads, and system transmission performance is ensured.

In a possible implementation, in consideration of a processing time capability of the second device for the specified message, the time-frequency resource reserved by the first device for the second device meets the processing time capability (processing time capability) of the second device for the specified message, so that it can be ensured that the second device has time to process the specified message, and successfully feeds back the processed specified message in a timely manner, to ensure effective running of a system. For example, if the specified message is the channel state information, the second device needs to take specific time to measure a channel state, to generate the channel state information. A location of the reserved time-frequency resource is set after the second device completes measurement of the channel state, and the location of the reserved time domain resource can meet a processing time capability of the second device for the CSI (a processing time capability for the channel state information). For another example, if the specified message is the power control assistance information, the second device needs to take specific time to measure power and the like, to generate the power control assistance information. A location of the reserved time-frequency resource is set after the second device completes measurement of the power and the like, and the location of the reserved time domain resource location can meet a processing time capability of the second device for the corresponding assistance information (a processing time capability for the assistance information).

In a possible implementation, the third format further includes at least one field indicating the specified message. In this way, the first device indicates, by using the at least one field, a type of the specified message that the second device needs to feed back, to ensure that the specified message such as the channel state information, the resource selection assistance information, the positioning information, or the power control assistance information can be effectively fed back in a timely manner, so as to improve system performance.

For example, one field in the third format indicates the specified message, the field may include two bits, and different values of the field indicate different types of the specified message. For example, when a value of the two bits is 00, it indicates that the type of the specified message is the channel state information; when a value of the two bits is 01, it indicates that the type of the specified message is the resource selection assistance information; when a value of the two bits is 10, it indicates that the type of the specified message is the positioning information; or when a value of the two bits is 11, it indicates that the type of the specified message is the power control assistance information. It should be noted that a quantity of fields indicating the specified message and a quantity of bits included in each field in the first format a may be determined based on the type of the specified message. For example, if there are four types of specified messages, the first format a may indicate the specified message by using one field including two or more bits, or the first format a may jointly indicate the specified message by using two fields including two or more bits in total. This is not limited in this embodiment of this application.

In an example, SCI2-C reuses a CSI request (channel state information request) field in SCI2-A, the CSI request field in SCI2-A occupies one bit, and the CSI request field in SCI2-C is extended from original one bit to X bits, where X is a positive integer. Different values of the X bits indicate different types of the specified message. Optionally, if there are four types of specified messages, X may be 2. In this way, the CSI request field in SCI2-A is reused, to ensure system transmission performance.

In a possible implementation, the first format a further includes at least one field indicating modulation and coding information and demodulation pilot information that are used when the second device feeds back the specified message. In this way, the first device indicates, by using the at least one field, the second device to feed back the specified message by using the modulation and coding information and the demodulation pilot information, to ensure timely and successful feedback of the specified message.

For example, the modulation and coding information and the demodulation pilot information may include a modulation and coding scheme, a pilot pattern, a quantity of pilot ports, and a modulation and coding scheme table indication. A plurality of fields in the first format a indicate the modulation and coding information and the demodulation pilot information that are used when the second device feeds back the specified message. For example, four fields may indicate the modulation and coding information and the demodulation pilot information that are used when the second device feeds back the specified message. One field indicates the modulation and coding scheme used when the second device feeds back the specified message, one field indicates the pilot pattern used when the second device feeds back the specified message, one field indicates a modulation and coding scheme table used when the second device feeds back the specified message, and one field indicates the quantity of pilot ports used when the second device feeds back the specified message.

In an example, SCI1-B reuses a Modulation and coding scheme (modulation and coding scheme) field, an Additional MCS table indicator (additional modulation and coding scheme table) field, a DMRS pattern (demodulation reference signal pattern) field, and a Number of DMRS port (quantity of demodulation reference signal ports) field in SCI1-A. In the four fields in SCI1-B, the Modulation and coding scheme field indicates the modulation and coding scheme used when the second device feeds back the specified message, the Additional MCS table indicator field indicates the modulation and coding scheme table used when the second device feeds back the specified message, the DMRS pattern field indicates the pilot pattern used when the second device feeds back the specified message, and the Number of DMRS port field indicates port information used when the second device feeds back the specified message. In this way, SCI1-B reuses the fields in SCI1-A, so that there is no additional increase in PSCCH signaling overheads, and system transmission performance is ensured.

In a possible implementation, the first format a further includes at least one field indicating a period in which the second device feeds back the specified message. In this way, when the first device expects the second device to periodically feed back the specified message, the first device may indicate, by using the at least one field, the second device to feed back the specified message based on the period, to ensure effective running of a system.

For example, one field in the first format a may indicate the period in which the second device feeds back the specified message. For example, if the specified message is the channel state information, the first device expects the second device to feed back the channel state information every 5 ms. The field in the first format a may indicate that the period in which the second device feeds back the channel state information is 5 ms. It may be understood that more fields in the first format a may indicate the period in which the second device feeds back the specified message. A quantity of fields indicating the period in which the second device feeds back the specified message is not limited in this embodiment of this application.

In an example, SCI1-B reuses a Resource reservation period (resource reservation period) field in SCI1-A, and the Resource reservation period field in SCI1-B indicates the period in which the second device feeds back the specified message. In this way, the Resource reservation period field in SCI1-A is reused, so that there is no additional increase in PSCCH signaling overheads, and system transmission performance is ensured.

In a possible implementation, the third format further includes all bits of a source identifier of the first control information and the second control information and all bits of a destination identifier of the first control information and the second control information. The first device may send only the first control information and the second control information to the second device, and does not send the associated data channel. In this case, a source identifier and a destination identifier of a physical layer L1 exist, but a source identifier and a destination identifier of a data link layer L2. In this way, the first device can clearly indicate the source identifier and the destination identifier of the first control information and the second control information by using all the bits of the source identifier and all the bits of the destination identifier in the third format, to ensure that an object expected by the first device successfully feeds back the specified message in a timely manner.

For example, two fields in the third format include all the bits of the source identifier of the first control information and the second control information and all the bits of the destination identifier of the first control information and the second control information. One field includes all the bits of the source identifier of the first control information and the second control information, and the other field includes all the bits of the destination identifier of the first control information and the second control information. It may be understood that one or more fields in the third format may include all the bits of the source identifier of the first control information and the second control information and all the bits of the destination identifier of the first control information and the second control information. This is not limited in this embodiment of this application.

In an example, SCI2-C reuses a Source ID (source identity) field and a Destination ID (destination identity) field in SCI2-A. The Source ID field in SCI2-A includes only a source identifier of a physical layer L1, and a source identifier of the physical layer L1 and a data link layer L2 is supplemented in the Source ID field in SCI2-C. The Destination ID field in SCI2-A includes only a destination identifier of the physical layer L1, and a destination identifier of the physical layer L1 and the data link layer L2 is supplemented in the Destination ID field in SCI2-C. In this way, the Source ID field and the Destination ID field in SCI2-A are reused as much as possible to ensure system transmission performance.

In an example, SCI2-C reuses a New data indicator (new data indicator, NDI) field, a Redundancy version (redundancy version) field, a HARQ feedback enabled/disabled indicator (hybrid automatic repeat request processing feedback enabled/disabled indicator) field, a Source ID field, and a Destination ID field in SCI2-A. The first device and the second device agree in advance that when the second control information is SCI2-C, the corresponding NDI field, redundancy version field, and HARQ feedback enabled/disabled indicator field are processed according to a pre-agreement, so that idle bits exists in the NDI field, the redundancy version field, and the HARQ feedback enabled/disabled indicator field. In this way, in SCI2-C, the Source ID field indicates a source identifier of a physical layer L1, the Destination ID field indicates a destination identifier of the physical layer L1, and the idle bits in the NDI field, the redundancy version field, and the HARQ feedback enabled/disabled indicator field may indicate a source identifier of data link layers L2 of SCI1-B and SCI2-C and a destination identifier of the data link layers L2 of SCI1-B and SCI2-C. If there are insufficient idle bits, bits may be further added for supplementation. For example, idle bits in the New data indicator field and the HARQ feedback enabled/disabled indicator field in SCI2-C may be supplemented as all bits of the source identifier of the data link layers L2 of SCI1-B and SCI2-C, and idle bits in the Redundancy version field may be supplemented as all bits of the destination identifier of the data link layers L2 of SCI1-B and SCI2-C. For another example, idle bits in the New data indicator field and the HARQ feedback enabled/disabled indicator field in SCI2-C may be supplemented as all bits of the destination identifier of the data link layers L2 of SCI1-B and SCI2-C, and idle bits in the Redundancy version field may be supplemented as all bits of the source identifier of the data link layers L2 of SCI1-B and SCI2-C. If there are insufficient idle bits, bits may be further added for supplementation. In this way, the New data indicator field, the HARQ feedback enabled/disabled indicator field, the Redundancy version field, the Source ID field, and the Destination ID field in SCI2-A are reused, to ensure system transmission performance.

It should be noted that, in addition to the foregoing fields described as examples, the first control information and the second control information may further include another field. This is not limited in this embodiment of this application.

For example, the first format a is SCI1-B, and the second format a is SCI1-A. SCI1-B reuses a field in SCI1-A. Table 1 is a comparison table of definitions of same fields in SCI1-B and SCI1-A. As shown in Table 1, SCI1-A is an SCI format in the existing standard protocol. A value of two reserved bits in the Reserved field is 00 by default, indicating that SCI1 is SCI1-A. Fields in SCI1-A and definitions corresponding to the fields are the same as those in the standard protocol. SCI1-B includes the same fields as SCI1-A, but definitions of the same fields are different.

TABLE 1

| | Comparison table of definitions of fields in SCI1-A and SCI1-B | |
|---|---|---|
| Field | Definition in SCI1-A | Definition in SCI1-B |
| Priority | Priorities of current and future reserved time-frequency resources of TxUE | Priority of a time-frequency resource reserved by the TxUE for RxUE |
| Frequency resource assignment | Current and future reserved frequency domain resources of the TxUE | Frequency domain resource reserved by the TxUE for feeding back a specified message by the RxUE |
| Time resource assignment | Current and future reserved time domain resources of the TxUE | Time domain resource reserved by the TxUE for feeding back the specified message by the RxUE |
| Resource reservation period | Period of a time domain resource reserved by TxUE for the future | Period that is indicated by the TxUE and in which the RxUE feeds back the specified message |
| DMRS pattern | Pilot pattern for TxUE transmission | Pilot pattern indicated by the TxUE and used when the RxUE feeds back the specified message |
| 2nd-stage SCI format | Corresponding SCI2 format indicated by SCI1-A | Corresponding SCI2-C indicated by SCI1-B |
| Beta_offset indicator | Parameter related to SCI2 | Parameter related to SCI2-C |
| Number of DMRS port | Port information for TxUE transmission | Port information indicated by the TxUE and used when the RxUE feeds back the specified message |
| Modulation and coding scheme | MCS for TxUE transmission | MCS indicated by the TxUE and used when the RxUE feeds back the specified message |
| Additional MCS table indicator | MCS Table indicator for TxUE Transmission | MCS table indicated by the TxUE and used when the RxUE feeds back the specified message |
| PSFCH overhead indication | PSFCH overhead information corresponding to TxUE transmission | PSFCH overhead information indicated by the TxUE and used when the RxUE feeds back the specified message |
| Reserved | Reserved bit with no additional indication information | Indicating an SCI1 format |

As shown in Table 1, the Priority (priority) field indicates, in SCI1-A, a priority of a time-frequency resource occupied by the first device for current transmission and a priority of a further reserved time-frequency resource, and indicates, in SCI1-B, a priority of a time-frequency resource reserved by the first device for the second device. The Frequency resource assignment field indicates, in SCI1-A, the time-frequency resource occupied by the first device for the current transmission and a future reserved frequency domain resource, and indicates, in SCI1-B, a frequency domain resource reserved by the first device for feeding back the specified message by the second device. The Time resource assignment field indicates, in SCI1-A, the time-frequency resource occupied by the first device for the current transmission and a future reserved time domain resource, and indicates, in SCI1-B, a time domain resource reserved by the first device for feeding back the specified message by the second device. The Resource reservation period field indicates, in SCI1-A, a period of a time domain resource reserved by the first device for the future, and indicates, in SCI1-B, the period that is indicated by the first device and in which the second device feeds back the specified message. The DMRS pattern field indicates, in SCI1-A, a pilot pattern for transmission of the first device, and indicates, in SCI1-B, a pilot pattern indicated by the first device and used when the second device feeds back the specified message. The 2nd-stage SCI format field indicates, in SCI1-A, the corresponding SCI2 format indicated by SCI1-A, and indicates, in SCI1-B, that an SCI2 format corresponding to SCI1-B is SCI2-C. The Beta offset indicator (13 offset indicator) field indicates, in SCI1-A, the parameter related to SCI2, and indicates, in SCI1-B, the parameter related to SCI2-C. The Number of DMRS port field indicates, in SCI1-A, port information for transmission of the first device, and indicates, in SCI1-B, port information indicated by the first device and used when the second device to feed back the specified message. The Modulation and coding scheme field indicates, in SCI1-A, an MCS for transmission of the first device, and indicates, in SCI1-B, an MCS indicated by the first device and used when the second device feeds back the specified message. The Additional MCS table indicator field indicates, in SCI1-A, an MCS table for transmission of the first device, and indicates, in SCI1-B, an MCS table indicated by the first device and used when the second device feeds back the specified message. The PSFCH overhead indication (PSFCH overhead indication) field indicates, in SCI1-A, corresponding PSFCH overhead information for transmission of the first device, and indicates, in SCI1-B, PSFCH overhead information indicated by the first device and used when the second device feeds back an indication message. The Reserved field is a reserved bit in SCI1-A and has no additional indication information, and indicates, in SCI1-B, that a format is SCI1-B.

For example, the third format is SCI2-C, and the fourth format is SCI2-A. SCI2-C reuses a field in SCI2-A. Table 2 is a comparison table of definitions of same fields in SCI2-C and SCI2-A. As shown in Table 2, SCI2-A is an SCI format in the existing standard protocol, and fields in SCI2-A and definitions corresponding to the fields are the same as those in the standard protocol. SCI2-C includes the same fields as SCI2-A, but definitions of the same fields are different.

TABLE 2

| Comparison table of definitions of fields in SCI2-A and SCI2-C | | |
|---|---|---|
| Field | Definition in SCI2-A | Definition in SCI2-C |
| HARQ process number | HARQ processing process number for TxUE transmission | HARQ process number indicated by TxUE and used when RxUE feeds back a specified message |
| New data indicator | NDI information for TxUE transmission | NDI information indicated by the TxUE and used when the RxUE feeds back the specified message |
| Redundancy version | Redundancy version number for TxUE transmission | Redundancy version number indicated by the TxUE and used when the RxUE feeds back the specified message |
| Source ID | Source ID corresponding to TxUE transmission | L1 ID + L2 ID information corresponding to TxUE transmission |
| Destination ID | Destination ID corresponding to TxUE transmission | L1 ID + L2 ID information corresponding to TxUE transmission |
| HARQ feedback enabled/disabled indicator | Whether a HARQ feedback associated with TxUE transmission is enabled | The TxUE indicates whether a HARQ feedback is provided for the specified message fed back by the RxUE. |
| Cast type indicator | Cast type of the TxUE | Cast type of the TxUE |
| CSI request | Indicating that the TxUE triggers the RxUE to feed back CSI | Type of the specified message |

As shown in Table 2, the HARQ process number (hybrid automatic repeat request processing process number) field indicates, in SCI2-A, a HARQ processing process number for transmission of the first device, and indicates, in SCI2-C, a HARQ process number indicated by the first device and used when the second device feeds back the specified message. The New data indicator field indicates, in SCI2-A, NDI information for transmission of the first device, and indicates, in SCI2-C, NDI information indicated by the first device and used when the second device feeds back the specified message. The Redundancy version field indicates, in SCI2-A, a redundancy version number for transmission of the first device, and indicates, in SCI2-C, a redundancy version number indicated by the first device and used when the second device feeds back the specified message. The Source ID field indicates, in SCI2-A, a source ID corresponding to transmission of the first device, and indicates, in SCI2-C, source ID information of a physical layer L1 and source ID information of a data link layer L2 that correspond to transmission of the first device. The Destination ID field indicates, in SCI2-A, a destination ID corresponding to transmission of the first device, and indicates, in SCI2-C, destination ID information of the physical layer L1 and destination ID information of the data link layer L2 that correspond to transmission of the first device. The HARQ feedback enabled/disabled indicator field indicates, in SCI2-A, whether a HARQ feedback associated with transmission of the first device is enabled, and indicates, in SCI2-C, that the first device indicates whether a HARQ feedback is provided for the specified message fed back by the second device. The Cast type indicator (type conversion indication) field indicates, in SCI2-A, a cast type of transmission of the first device and indicates, in SCI2-C, a cast type of transmission of the first device. The CSI request field indicates, in SCI2-A, that the first device triggers the second device to feed back CSI, and indicates, in SCI2-C, a type, indicated by the first device, of the specified message fed back by the second device.

It should be noted that Table 1 and Table 2 are examples of descriptions of the fields in SCI1-B, SCI1-A, SCI2-C, and SCI2-A. For definitions of the fields, refer to the foregoing related descriptions. Details are not described herein again.

It can be learned from Table 1 and Table 2 that SCI on a sidelink includes indication information for the time-frequency resource and the like for TxUE transmission, and is not associated with information such as a time-frequency resource for feedback of the RxUE. In this embodiment of this application, the format and the field in the SCI in the standard protocol are reused, and no new field needs to be created. The newly defined SCI1-B and SCI2-C are obtained by slightly modifying existing fields in SCI1-A and SCI2-A. SCI1-B and SCI2-C indicate information such as the reserved time-frequency resource for feeding back the specified message by the RxUE, to ensure timely and successful feedback of an important message, so as to improve system performance. In addition, no new field is added to SCI1-B and SCI2-C to ensure system transmission performance.

In an example, when the first device sends a message to the second device, if the second device needs to feed back the specified message in a timely and guaranteed manner, the time-frequency resource may be reserved for the specified message. In this case, the first device may send SCI1-B and SCI2-C to the second device, to indicate information such as the reserved time-frequency resource for feeding back the specified message by the second device, the type of the specified message, and the modulation and coding used when the specified message is fed back. In this way, the first device sends the sidelink control information SCI1-B and SCI2-C to reserve the time-frequency resource for the specified message, to ensure timely and successful feedback of the specified message, so as to improve SL-U communication system performance.

Step 502: The second device receives the first control information and the second control information that are sent by the first device.

The first control information may include the at least one of the first field or the second field, the at least one of the first field or the second field indicates the format of the first control information, and the at least one of the first field or the second field indicates the format of the second control information. The format of the first control information includes at least the first format a and the second format a. The first format a indicates the time-frequency resource for feeding back a specified message by the second device, and the second format a indicates the transmission information of the data channel sent by the first device. The format of the second control information includes at least the third format and the fourth format. The third format indicates the redundancy version of the specified message fed back by the second device, and the fourth format indicates the redundancy version of the data channel sent by the first device.

For related descriptions of the first field, the second field, the first format a, the second format a, the third format, the fourth format, and the like, refer to step 501. Details are not described herein again.

For example, the second device determines the format of the first control information and the format of the second control information based on the first field and/or the second field. If it is determined that the format of the received first control information is the first format a and the format of the second control information is the third format, for example, SCI1-B and SCI2-C that are sent by the first device are received by the second device, the second device determines information such as the reserved time-frequency resource and the modulation and coding that are indicated by fields in the first format a and the second format a, and prepares to feed back, on the reserved time-frequency resource, the specified message expected by the first device.

In a possible implementation, the second device determines, based on the at least one field that is included in the first format a and that indicates the time-frequency resource, the time-frequency resource for feeding back the specified message. Preferably, the time-frequency resource meets the processing time capability of the second device for the specified message. For example, the second device may determine, by using the Frequency resource assignment field in SCI1-B, the frequency domain resource for feeding back the specified message, and determine, by using the Time resource assignment field in SCI1-B, the time domain resource for feeding back the specified message.

In a possible implementation, the second device determines the type of the specified message based on the at least one field that is included in the third format and that indicates the specified message. For example, the second device may determine the type of the specified message by using the CSI request in SCI2-C.

In a possible implementation, the second device determines, based on the at least one field that is included in the first format a and that indicates the modulation and coding information and the demodulation pilot information that are used when the second device feeds back the specified message, the modulation and coding information and the demodulation pilot information that are used when the specified message is fed back. For example, the second device may determine, by using the Modulation and coding scheme field in SCI1-B, the modulation and coding scheme used when the specified message is fed back; or determine, by using the Additional MCS table indicator field in SCI1-B, the modulation and coding scheme table used when the specified message is fed back; or determine, by using the DMRS pattern field in SCI1-B, the pilot pattern used when the specified message is fed back; or determine, by using the Number of DMRS port field in SCI1-B, port information used when the specified message is fed back.

In a possible implementation, the second device determines, based on the at least one field that is included in the first format a and that indicates the period in which the second device feeds back the specified message, the period in which the specified message is fed back. For example, the second device may determine, by using the Resource reservation period field in SCI1-B, the period in which the specified message is fed back.

In a possible implementation, the second device determines the source identifier and the destination identifier of the first control information and the second control information based on all the bits of the source identifier of the first control information and the second control information and all the bits of the destination identifier of the first control information and the second control information that are included in the third format. For example, the second device may determine a source identifier of SCI2-C by using the source identifier of the physical layer L1 and the data link layer L2 in the Source ID field in SCI2-C, and determine a destination identifier of SCI2-C by using the destination identifier of the physical layer L1 and the data link layer L2 in the Destination ID field in SCI2-C.

For example, the second device determines ownership of the currently transmitted message by using the source identifier and the destination identifier of the first control information and the second control information. The second device skips using the time-frequency resource when the destination identifier determined by the second device is different from an identifier of the second device, so that avoidance can be performed on the reserved time-frequency resource, and timely and successful feedback of the specified message on the time-frequency resource is ensured. Optionally, the second device may determine, based on a priority of the time-frequency resource, whether to perform avoidance on the reserved time-frequency resource, to ensure successful transmission of data with a higher priority, so as to improve system performance.

For example, as shown in FIG. 4, a sending terminal in the sending terminal group 401 sends SCI1-B and SCI2-C to the receiving terminal group 402 and the receiving terminal group 403. If a receiving terminal in the receiving terminal group 402 receives SCI1-B and SCI2-C, and a destination identifier determined based on fields in SCI1-B and SCI2-C is the same as an identifier of the receiving terminal, the receiving terminal prepares to feed back a specified message on a reserved time-frequency resource. If a receiving terminal in the receiving terminal group 403 receives SCI1-B and SCI2-C, and a destination identifier determined based on fields in SCI1-B and SCI2-C is different from an identifier of the receiving terminal, the receiving terminal performs avoidance on a reserved time-frequency resource.

Step 503: When the first control information is in the first format a and the second control information is in the third format, the second device feeds back the specified message to the first device on the time-frequency resource.

In this step, when the first control information is in the first format a and the second control information is in the third format, the second device may directly feed back the specified message to the first device on the reserved time-frequency resource determined in step 502, to ensure timely and successful feedback of the specified message, so as to improve system performance. In addition, the second device does not need to select a time-frequency resource through channel contention or send control information. This reduces power consumption of the second device.

For example, the second device may feed back, on the determined time-frequency resource based on the determined modulation and coding information and demodulation pilot information that are used when the specified message is sent, content of the specified message that needs to be fed back, to ensure that the specified message such as the channel state information, the resource selection assistance information, the positioning information, or the power control assistance information can be effectively fed back in a timely manner, so as to improve system performance. Further, the second device may further feed back the specified message in a timely manner based on the determined period in which the specified message is fed back, to ensure effective running of a system.

In an example, when the second device receives SCI1-B and SCI2-C, the second device may feed back the specified message based on information determined by fields such as the Frequency resource assignment field, the Time resource assignment field, the CSI request field, the Modulation and coding scheme field, the Number of DMRS port field, and the Resource reservation period field in SCI1-B.

In a possible implementation, when the first control information is in the first format a and the second control information is in the third format, the second device may feed back HARQs for the first control information and the second control information, or may not feed back HARQs for the first control information and the second control information. For example, a manner of feeding back the HARQ information includes: sending an acknowledgement (Acknowledgement, ACK) message or sending a negative acknowledgement (Negative Acknowledgement, NACK).

For example, when the second device receives SCI1-B and SCI2-C, the second device may not feed back HARQs for SCI1-B and SCI2-C, or may feed back HARQs for SCI1-B and SCI2-C. When the second device feeds back the HARQs for SCI1-B and SCI2-C, if receiving fails, the second device transmits HARQ-NACK information on a PSFCH, and transmits no information on the PSFCH in another case; or if receiving succeeds, the second device transmits HARQ-ACK information on a PSFCH, and if receiving fails, transmits HARQ HARQ-NACK information.

Step 504: When the first control information is in the first format a and the second control information is in the third format, the first device receives, on the time-frequency resource, the specified message fed back by the second device.

In this step, when the first control information is in the first format a and the second control information is in the third format, the first device may directly receive, on the time-frequency resource, the specified message fed back by the second device, and does not need to blindly detect a time-frequency resource on which the specified message is located or detect control information. This reduces power consumption of the first device.

In an example, after sending SCI1-B and SCI2-C, the first device may receive, on the time domain resource specified by the Frequency resource assignment field and the Time resource assignment field in SCI1-B, the specified message fed back by the second device.

In a possible implementation, when the first control information is in the first format a and the second control information is in the third format, the first device may detect HARQs for the first control information and the second control information, or may not detect HARQs for the first control information and the second control information. Optionally, if the second device feeds back HARQs for the first control information and the second control information, the first device may receive the HARQs, to improve reliability of communication between the first device and the second device.

For example, after the first device sends SCI1-B and SCI2-C, the first device may not detect HARQs for SCI1-B and SCI2-C, or may detect HARQs for SCI1-B and SCI2-C.

Optionally, if the second device feeds back HARQs for SCI1-B and SCI2-C, the first device may receive the HARQs.

In this embodiment of this application, the first control information includes the at least one of the first field or the second field, the at least one of the first field or the second field indicates the format of the first control information, and the at least one of the first field or the second field indicates the format of the second control information. The first format a of the first control information indicates the time-frequency resource for feeding back the specified message by the second device, and the third format of the second control information indicates the redundancy version of the specified message fed back by the second device. In this way, the time-frequency resource is reserved for the specified message, to ensure timely and successful feedback of the specified message, so as to improve system performance.

FIG. 6 is a flowchart of another communication method according to an embodiment of this application. The method may be applied to the communication system in FIG. 3 or FIG. 4. A first device may be the terminal 301 in FIG. 3, and correspondingly, a second device may be the terminal 302 in FIG. 3. Alternatively, a first device may be the sending terminal in the sending terminal group 401 in FIG. 4, and correspondingly, a second device may be the receiving terminal in the receiving terminal group 402 and/or the receiving terminal in the receiving terminal group 403 in FIG. 4. As shown in FIG. 6, the method may include the following steps.

Step 601: The first device sends first control information, second control information, and a data channel to the second device.

For example, the first device may send the first control information, the second control information, and the data channel in a multicast, unicast, or broadcast manner. For example, the first device may send the first control information, the second control information, and the data channel to one second device (a unicast scenario), or the first device may send the first control information, the second control information, and the data channel to a plurality of second devices (a multicast scenario), or the first device may send the first control information, the second control information, and the data channel to an unlimited quantity of second devices (a broadcast scenario).

The first control information indicates transmission information of the data channel sent by the first device. For content of the transmission information, refer to the foregoing related descriptions. Details are not described herein again. For example, the first control information and the second control information are SCI, and the data channel is a PSSCH. Optionally, the first control information may be existing first-stage SCI1, for example, may be SCI1-A in a standard protocol. For fields included in SCI1-A and definitions of the fields, refer to Table 1.

The first control information may include at least one field indicating a format of the second control information. The format of the second control information includes at least a first format b and a second format b, the first format b indicates a time-frequency resource for feeding back a specified message by the second device, and the second format b indicates a redundancy version of a data channel sent by the first device. For content of the specified message, the time-frequency resource, and the like, refer to the foregoing related descriptions. Details are not described herein again. Optionally, the second format b may be existing second-stage SCI2, for example, may be SCI2-A or SCI2-B in the standard protocol. For ease of description, in this embodiment of this application, an example in which the second format b is SCI2-A in the standard protocol is used for description. For fields included in SCI2-A and definitions of the fields, refer to Table 2. The first format b may be new second-stage SCI2. To distinguish from SCI2-A and SCI2-B in the standard protocol, the new second-stage SCI2 is defined as SCI2-D in this embodiment of this application. SCI2-D includes at least one field in SCI2-A, and based on this, a new field is added to carry information such as the reserved time-frequency resource.

For example, the first control information may indicate the format of the second control information by using one field, and different values of the field may indicate the format of the second control information. For example, one bit (bit) or two bits in the field may indicate the format of the second control information. For example, when a value of the two bits is 11 (or 10), it indicates that the format of the second control information is the first format b, or when a value of the two bits is 00 (or 01), it indicates that the format of the second control information is the second format b.

In an example, the field may be a Reserved field in SCI1-A, and two bits in the Reserved field indicate the format of the second control information. For example, when a value of the two bits is 00, it indicates that the second control information is SCI2-A, or when a value of the two bits is 11, it indicates that the second control information is SCI2-D. Alternatively, the field may be a 2nd-stage SCI format field in SCI1-A, and two bits in the 2nd-stage SCI format field indicate the format of the second control information. For example, when a value of the two bits is 00, it indicates that the second control information is SCI2-A, or when a value of the two bits is 10, it indicates that the second control information is SCI2-D.

In this manner, the Reserved field or the 2nd-stage SCI format field in the SCI format SCI1-A in the standard protocol is modified. The two bits in the Reserved field in SCI1-A indicate the format of the second control information, or the two bits in the 2nd-stage SCI format indicate the format of the second control information. In this way, the field in the SCI format in the standard protocol is reused, so that there is no additional increase in PSCCH signaling overheads, and system transmission performance is ensured.

The following describes other fields that may be included in the second control information.

In a possible implementation, the first format b may include at least one field indicating the time-frequency resource. The first device reserves, by using the at least one field, the time-frequency resource for feeding back the specified message by the second device, to ensure that the specified message can be successfully fed back in a timely manner on a part or all of the time-frequency resource.

In this implementation, for specific content in which different quantities of fields in the first format b indicate the time-frequency resource reserved for the specified message, refer to related descriptions in the first format a. Details are not described herein again. It should be noted that, different from the reused field in the first format a, the field in the first format b is a newly added field.

In an example, based on SCI2-A, a Frequency resource assignment field and a Time resource assignment field are newly added to SCI2-D. The two fields in SCI2-D: the Frequency resource assignment field and the Time resource assignment field indicate the time-frequency resource reserved for the specified message. The Frequency resource assignment field indicates a reserved frequency domain resource, and the Time resource assignment field indicates a reserved time domain resource.

In a possible implementation, in consideration of a processing time capability of the second device for the specified message, the time-frequency resource reserved by the first device for the second device meets the processing time capability of the second device for the specified message, so that it can be ensured that the second device has time to process the specified message, and successfully feeds back the processed specified message in a timely manner, to ensure effective running of a system. For specific content of the processing time capability in this implementation, refer to the foregoing related descriptions. Details are not described herein again.

In a possible implementation, the first format b may further include at least one field indicating the specified message. In this way, the first device indicates, by using the at least one field, a type of the specified message that the second device needs to feed back, to ensure that the specified message such as channel state information, resource selection assistance information, positioning information, or power control assistance information can be effectively fed back in a timely manner, so as to improve system performance.

In this implementation, for specific content in which different quantities of fields in the first format b indicate the type of the specified message, refer to related descriptions in the first format a. Details are not described herein again.

In an example, SCI2-D reuses a CSI request (channel state information request) field in SCI2-A, the CSI request field in SCI2-A occupies one bit, and the CSI request field in SCI2-D is extended from original one bit to X bits, where X is a positive integer. Different values of the X bits indicate different types of the specified message. Optionally, if there are four types of specified messages, X may be 2. In this way, the CSI request field in SCI2-A is reused, to ensure system transmission performance.

In a possible implementation, the first format b may further include at least one field indicating a period in which the second device feeds back the specified message. In this way, when the first device expects the second device to periodically feed back the specified message, the first device may indicate, by using the at least one field, the second device to feed back the specified message based on the period, to ensure effective running of a system.

In this implementation, for specific content of the period in which the specified message is fed back and that is indicated in the first format b, refer to related descriptions in the foregoing first format a. Details are not described herein again. It should be noted that, different from the reused field in the first format a, the field in the first format b is a newly added field.

In an example, based on SCI2-A, a Resource reservation period field is newly added to SCI2-D. The Resource reservation period field in SCI2-D indicates the period in which the second device feeds back the specified message.

It should be noted that, in addition to the foregoing fields described as examples, the first control information and the second control information may further include another field. This is not limited in this embodiment of this application.

For example, the first control information is SCI1-A, the first format b is SCI2-D, and the second format b is SCI2-A. For the definitions of the fields in SCI1-A, refer to Table 1. Details are not described herein again. A value of two reserved bits in the Reserved field is 00 by default, indicating that SCI1 is SCI1-A. Alternatively, one bit in the Reserved field may indicate the format of the second control information. SCI2-D may include all the fields in SCI2-A, and based on this, several fields are added, as shown in Table 3.

such as the reserved time-frequency resource, the SCI is used as a similar combination of a DL grant (downlink grant) and a UL grant (uplink grant), and an existing field in

TABLE 3

| Comparison table of definitions of field in SCI2-A and SCI2-D | | |
| --- | --- | --- |
| Field | Definition in SCI2-A | Definition in SCI2-D |
| HARQ process number | HARQ processing process number for TxUE transmission | HARQ processing process number for TxUE transmission |
| New data indicator | NDI information for TxUE transmission | NDI information for TxUE transmission |
| Redundancy version | Redundancy version number for TxUE transmission | Redundancy version number for TxUE transmission |
| Source ID | Source ID corresponding to TxUE transmission | Source ID corresponding to TxUE transmission |
| Destination ID | Destination ID corresponding to TxUE transmission | Destination ID corresponding to TxUE transmission |
| HARQ feedback enabled/disabled indicator | Whether a HARQ feedback associated with TxUE transmission is enabled | Whether the HARQ feedback associated with TxUE transmission is enabled |
| Cast type indicator | Cast type of the TxUE | Cast type of the TxUE |
| CSI request | Indicating that the TxUE triggers the RxUE to feed back CSI | Type of a specified message |
| Frequency resource assignment | \ | Frequency domain resource reserved by the TxUE for feeding back a specified message by the RxUE |
| Time resource assignment | \ | Time domain resource reserved by the TxUE for feeding back the specified message by the RxUE |
| Resource reservation period | \ | Period that is indicated by the TxUE and in which the RxUE feeds back the specified message |

As shown in Table 3, the HARQ process number field indicates, in both SCI2-A and SCI2-D, a HARQ processing process number for transmission of the first device. The New data indicator field indicates, in both SCI2-A and SCI2-D, NDI information for transmission of the first device. The Redundancy version field indicates, in both SCI2-A and SCI2-D, a redundancy version number for transmission of the first device. The Source ID field indicates, in both SCI2-A and SCI2-D, a source ID corresponding to transmission of the first device. The Destination ID field indicates, in both SCI2-A and SCI2-D, a destination ID corresponding to transmission of the first device. The HARQ feedback enabled/disabled indicator field indicates, in both SCI2-A and SCI2-D, whether a HARQ feedback associated with transmission of the first device is enabled. The Cast type indicator field indicates, in both SCI2-A and SCI2-D, a cast type of transmission of the first device. The CSI request field indicates, in SCI2-A, CSI that the first device triggers the second device to feed back, and indicates, in SCI2-D, a type of the specified message that the first device indicates the second device to feed back. In addition, SCI2-D further includes the newly added Frequency resource assignment field indicating the reserved frequency domain resource; the newly added Time resource assignment field indicating the reserved time domain resource; and the newly added Resource reservation period field indicating the period in which the second device feeds back the specified message.

It can be learned from Table 3 that SCI on a sidelink includes indication information for a time-frequency resource and the like for transmission of the TxUE, and is not associated with information such as the time-frequency resource for feedback by the RxUE. In this embodiment of this application, based on the SCI format and the field in the standard protocol, a new field is added to carry information SCI2-A is slightly modified to obtain the newly defined SCI2-D. SCI2-D indicates information such as the reserved time-frequency resource for feeding back the specified message by the RxUE, to ensure timely and successful feedback of an important message, so as to improve system performance. In addition, compared with the fields in the existing SCI2-A, in SCI2-D, only one field is redefined and definitions of other fields remain unchanged. Therefore, the definitions of the fields in SCI2-A in the existing protocol are changed as little as possible, and applicability of the newly defined SCI2-D is improved.

In an example, when the first device sends a message to the second device, if the second device needs to feed back the specified message in a timely and guaranteed manner, the time-frequency resource may be reserved for the specified message. In this case, the first device may send SCI1-A, SCI2-D, and a physical sidelink shared channel to the second device, to indicate transmission information of the physical sidelink shared channel by using SCI1-A, indicate, by using SCI2-D, information such as the type of the specified message type and the reserved time-frequency resource for feeding back the specified message by the second device, and provide information such as modulation and coding by using SCI1-A. In this way, the first device reserves the time-frequency resource for the specified message by sending the sidelink control information SCI2-D, SCI1-A, and the physical sidelink shared channel, to ensure timely and successful feedback of the specified message, so as to improve SL-U communication system performance.

Step 602: The second device receives the first control information, the second control information, and the data channel that are sent by the first device.

The first control information indicates the transmission information of the data channel sent by the first device, the first control information includes the at least one field indicating the format of second control information, and the format of the second control information includes at least the first format b and the second format b. The first format b indicates the time-frequency resource for feeding back the specified message by the second device, and the second format b indicates the redundancy version of the data channel sent by the first device.

For related descriptions of the first control information, the first format b, the second format b, and the like, refer to step 601. Details are not described herein again.

For example, the second device determines the format of the second control information based on the field that is in the first control information and that indicates the format of the second control information. If determining that the format of the received second control information is the first format b, for example, the second control information received by the second device is SCI2-D, the second device determines information such as the reserved time-frequency resource and the period in which the indication message is fed back that are indicated by the field in the first format b, and prepares to feed back, on the reserved time-frequency resource, the specified message expected by the first device.

In a possible implementation, the second device determines, based on the at least one field that is included in the first format b and that indicates the time-frequency resource, the time-frequency resource for feeding back the specified message. Preferably, the time-frequency resource meets the processing time capability of the second device for the specified message. For example, the second device may determine, by using the Frequency resource assignment field in SCI2-D, the frequency domain resource for feeding back the specified message, and determine, by using the Time resource assignment field in SCI2-D, the time domain resource for feeding back the specified message.

In a possible implementation, the second device may further use, based on a signal interference status on the time-frequency resource, a part with weak interference or without interference in the time-frequency resource as the time-frequency resource for feeding back the specified message, to ensure transmission performance; and/or the second device may use, based on a data volume of the specified message to be fed back, a part of the time-frequency resource as the time-frequency resource for feeding back the specified message, to reduce overheads.

In a possible implementation, the second device determines the type of the specified message based on the at least one field that is included in the first format b and that indicates the specified message. For example, the second device may determine the type of the specified message by using the CSI request in SCI2-D.

In a possible implementation, the second device determines, based on the at least one field that is included in the first format b and that indicates the period in which second device feeds back the specified message, the period in which the specified message is fed back. For example, the second device may determine, by using the Resource reservation period field in SCI2-D, the period in which the specified message is fed back.

In a possible implementation, the second device determines a source identifier and a destination identifier of the first control information and the second control information based on the Source ID field and the Destination ID field in the first format b and a source identifier and a destination identifier that are of a data link layer L2 and that are included in the data channel. The second device skips using the time-frequency resource when the destination identifier determined by the second device is different from an identifier of the second device, so that avoidance can be performed on the reserved time-frequency resource, and timely and successful feedback of the specified message on the time-frequency resource is ensured. Optionally, the second device may determine, based on a priority of the time-frequency resource, whether to perform avoidance on the reserved time-frequency resource, to ensure successful transmission of data with a higher priority, so as to improve system performance.

For example, as shown in FIG. 4, a sending terminal in the sending terminal group 401 sends SCI1-A, SCI2-D, and a data channel to the receiving terminal group 402 and the receiving terminal group 403. If a receiving terminal in the receiving terminal group 402 receives SCI1-A, SCI2-D, and the data channel, and a destination identifier determined based on a field in SCI2-D and the data channel is the same as an identifier of the receiving terminal, the sending terminal prepares to feed back a specified message on a reserved time-frequency resource. If a receiving terminal in the receiving terminal group 403 receives SCI1-A, SCI2-D, and a data channel, and a destination identifier determined based on a field in SCI2-D and the data channel is different from an identifier of the receiving terminal, the receiving terminal performs avoidance on a reserved time-frequency resource.

Step 603: When the second control information is in the first format b, the second device sends, to the first device, the specified message, control information indicating the transmission information of the specified message sent by the second device, and control information indicating the redundancy version of the specified message sent by the second device, where the specified message occupies a part or all of the time-frequency resource.

In this step, when the second control information is in the first format b, the second device may directly feed back the specified message to the first device on the reserved time-frequency resource determined in step 602, to ensure timely and successful feedback of the specified message, so as to improve system performance. In addition, the second device does not need to select a time-frequency resource through channel contention. This reduces power consumption of the second device.

For example, the second device may reuse, on the determined time-frequency resource, modulation and coding information and demodulation pilot information that are indicated by the first control information, to feed back content of the specified message that needs to be fed back, to ensure that the specified message such as channel state information, resource selection assistance information, positioning information, or power control assistance information can be effectively fed back in a timely manner, so as to improve system performance. Further, the second device may further feed back the specified message in a timely manner based on the determined period in which the specified message is fed back, to ensure effective running of a system.

In an example, when the second device receives SCI1-A and SCI2-D, the second device may feed back the specified message based on information determined by fields such as the Frequency resource assignment field, the Time resource assignment field, the CSI request field, and the Resource reservation period field in SCI2-D and information determined by fields such as a Modulation and coding scheme field and a Number of DMRS port field in SCI1-A.

In addition, the second device may further feed back a HARQ for the data channel sent by the first device. For example, a manner of feeding back the HARQ information includes an ACK or a NACK.

For example, when the second device receives SCI1-A, SCI2-D, and the data channel, the second device may feed back the HARQ for the data channel. If the second device fails to receive the data channel, the second device transmits HARQ-NACK information on a PSFCH, and transmits no information on the PSFCH in another case; or if the second device successfully receives the data channel, the second device transmits HARQ-ACK information on a PSFCH, and if the second device fails to receive the data channel, the second device transmits HARQ-NACK information on the PSFCH.

Step 604: When the second control information is in the first format b, the first device receives the specified message, the control information indicating the transmission information of the specified message sent by the second device, and the control information indicating the redundancy version of the specified message sent by the second device that are sent by the second device, where the specified message occupies the part or all of the time-frequency resource.

In this step, when the second control information is in the first format b, the first device may directly receive, on the time-frequency resource, the specified message fed back by the second device, to obtain the expected specified message in a timely manner.

After sending SCI1-A and SCI2-D, the first device may receive, on the time domain resource specified by the Frequency resource assignment field and the Time resource assignment field in SCI2-D, the specified message fed back by the second device.

In addition, the first device may further receive the HARQ for the data channel that is fed back by the second device, to improve reliability of communication between the first device and the second device. For example, the manner of feeding back the HARQ information includes the ACK or the NACK.

For example, if the first device receives the HARQ-NACK information fed back by the second device for the data channel, the first device may determine that the second device fails to receive the data channel, and perform retransmission; or if the first device does not receive the HARQ information fed back by the second device for the data channel, the first device may determine that the second device successfully receives the data channel. Alternatively, if the first device receives the HARQ-ACK information fed back by the second device for the data channel, the first device may determine that the second device successfully receives the data channel; or if the first device receives the HARQ-NACK information fed back by the second device for the data channel, the first device may determine that the second device fails to receive the data channel, and perform retransmission.

In this embodiment of this application, the first control information indicates the transmission information of the data channel sent by the first device, the first control information includes the at least one field indicating the format of the second control information, and the first format b of the second control information indicates the time-frequency resource for feeding back the specified message by the second device. In this way, the time-frequency resource is reserved for the specified message, to ensure timely and successful feedback of the specified message, so as to improve system performance.

Based on a same concept as the foregoing communication method, an embodiment of this application further provides a communication apparatus.

FIG. 7 is a structural diagram of a communication apparatus according to an embodiment of this application. As shown in FIG. 7, the apparatus may include a first module 701 and a second module 702. In some embodiments, the first module 701 is configured to send, by a first device, first control information and second control information to a second device. The first control information includes at least one of a first field or a second field, at least one of the first field or the second field indicates a format of the first control information, and at least one of the first field or the second field indicates a format of the second control information. The format of the first control information includes at least a first format a and a second format a, the first format a indicates a time-frequency resource for feeding back a specified message by the second device, and the second format a indicates transmission information of the data channel sent by the first device. The format of the second control information includes at least a third format and a fourth format, the third format indicates a redundancy version of the specified message fed back by the second device, and the fourth format indicates a redundancy version of the data channel sent by the first device. The second module 702 is configured to: when the first control information is in the first format a and the second control information is in the third format, receive, by the first device on the time-frequency resource, the specified message fed back by the second device.

In a possible implementation, the first format a further includes at least one field indicating the time-frequency resource.

In a possible implementation, the third format further includes at least one field indicating the specified message, and the specified message includes at least one of channel state information, resource selection assistance information, positioning information, or power control assistance information.

In a possible implementation, the first format a further includes at least one field indicating modulation and coding information and demodulation pilot information that are used when the second device feeds back the specified message.

In a possible implementation, the first format a further includes at least one field indicating a period in which the second device feeds back the specified message.

In a possible implementation, the third format further includes all bits of a source identifier of the first control information and the second control information and all bits of a destination identifier of the first control information and the second control information.

In a possible implementation, the time-frequency resource meets a processing time capability of the second device for the specified message.

In a possible implementation, the first control information or the second control information includes sidelink control information, and the data channel includes a physical sidelink shared channel.

In this embodiment of this application, the first device sends the first control information and the second control information to the second device. The first control information includes the at least one of the first field or the second field, the at least one of the first field or the second field indicates the format of the first control information, and the at least one of the first field or the second field indicates the format of the second control information. The first device indicates, based on the first format a of the first control information, the time-frequency resource for feeding back the specified message by the second device, indicates, based on the third format of the second control information, the redundancy version of the specified message fed back by the second device, and receives, on the time-frequency resource, the specified message fed back by the second device. In this way, the first device reserves the time-frequency resource for the specified message, to ensure timely and successful feedback of the specified message, so as to improve system performance. In addition, the first device directly receives, on the time-frequency resource, the specified message fed back by the second device, and does not need to blindly detect a time-frequency resource on which the specified message is located or detect control information. This reduces power consumption of the first device.

In some other embodiments, the first module 701 is configured to receive, by a second device, first control information and second control information that are sent by a first device. The first control information includes at least one of a first field or a second field, at least one of the first field or the second field indicates a format of the first control information, and at least one of the first field or the second field indicates a format of the second control information. The format of the first control information includes at least a first format a and a second format a, the first format a indicates a time-frequency resource for feeding back a specified message by the second device, and the second format a indicates transmission information of the data channel sent by the first device. The format of the second control information includes at least a third format and a fourth format, the third format indicates a redundancy version of the specified message fed back by the second device, and the fourth format indicates a redundancy version of the data channel sent by the first device. The second module 702 is configured to: when the first control information is in the first format a and the second control information is in the third format, feed back, by the second device, the specified message to the first device on the time-frequency resource.

In a possible implementation, the first format a further includes at least one field indicating the time-frequency resource.

In a possible implementation, the third format further includes at least one field indicating the specified message, and the specified message includes at least one of channel state information, resource selection assistance information, positioning information, or power control assistance information.

In a possible implementation, the first format a further includes at least one field indicating modulation and coding information and demodulation pilot information that are used when the second device feeds back the specified message.

In a possible implementation, the first format a further includes at least one field indicating a period in which the second device feeds back the specified message.

In a possible implementation, the third format further includes all bits of a source identifier of the first control information and the second control information and all bits of a destination identifier of the first control information and the second control information.

In a possible implementation, the first module 701 is further configured to skip using, by the second device, the time-frequency resource when the destination identifier is different from an identifier of the second device.

In a possible implementation, the time-frequency resource meets a processing time capability of the second device for the specified message.

In this embodiment of this application, the second device receives the first control information and the second control information that are sent by the first device. The first control information includes the at least one of the first field or the second field, the at least one of the first field or the second field indicates the format of the first control information, and the at least one of the first field or the second field indicates the format of the second control information. The first format a of the first control information indicates the time-frequency resource for feeding back the specified message by the second device, and the third format of the second control information indicates the redundancy version of the specified message fed back by the second device. When the first control information is in the first format a and the second control information is in the third format, the second device feeds back the specified message to the first device on the time-frequency resource. In this way, the second device feeds back the specified message on the reserved time-frequency resource, to ensure timely and successful feedback of the specified message, so as to improve system performance. In addition, when sending the specified message, the second device does not need to select a time-frequency resource through channel contention or send control information. This reduces power consumption of the second device.

In some other embodiments, the first module 701 is configured to send, by a first device, first control information, second control information, and a data channel to a second device. The first control information indicates transmission information of the data channel sent by the first device, and the first control information includes at least one field indicating a format of the second control information. The format of the second control information includes at least a first format b and a second format b, the first format b indicates a time-frequency resource for feeding back a specified message by the second device, and the second format b indicates a redundancy version of the data channel sent by the first device. The second module 702 is configured to: when the second control information is in the first format b, receive, by the first device, the specified message, control information indicating transmission information of the specified message sent by the second device, and control information indicating the redundancy version of the specified message sent by the second device that are sent by the second device, where the specified message occupies a part or all of the time-frequency resource.

In a possible implementation, the first format b further includes at least one field indicating the time-frequency resource.

In a possible implementation, the first format b further includes at least one field indicating the specified message, and the specified message includes at least one of channel state information, resource selection assistance information, positioning information, or power control assistance information.

In a possible implementation, the first format b further includes at least one field indicating a period in which the second device feeds back the specified message.

In a possible implementation, the time-frequency resource meets a processing time capability of the second device for the specified message.

In a possible implementation, the first control information or the second control information includes sidelink control information, and the data channel includes a physical sidelink shared channel.

In this embodiment of this application, the first device sends first control information, the second control information, and the data channel to the second device. The first control information indicates the transmission information of the data channel sent by the first device, and the first control information includes the at least one field indicating the format of the second control information. The first device indicates, based on the first format b of the second control information, the time-frequency resource for feeding back the specified message by the second device, and receives the specified message, the control information indicating transmission information of the specified message sent by the second device, and the control information indicating the redundancy version of the specified message sent by the second device that are sent by the second device, where sixth control information indicates the redundancy version of the specified message sent by the second device, and the specified message occupies the part or all of the time-frequency resource. In this way, the first device reserves the time-frequency resource for the specified message, to ensure timely and successful feedback of the specified message, so as to improve system performance.

In some other embodiments, the first module 701 is configured to receive, by a second device, first control information, second control information, and a data channel that are sent by a first device. The first control information indicates transmission information of the data channel sent by the first device, and the first control information includes at least one field indicating a format of the second control information. The format of the second control information includes at least a first format b and a second format b, the first format b indicates a time-frequency resource for feeding back a specified message by the second device, and the second format b indicates a redundancy version of the data channel sent by the first device. The second module 702 is configured to: when the second control information is in the first format b, send, by the second device to the first device, the specified message, control information indicating transmission information of the specified message sent by the second device, and control information indicating the redundancy version of the specified message sent by the second device, where the specified message occupies a part or all of the time-frequency resource.

In a possible implementation, the first format b further includes at least one field indicating the time-frequency resource.

In a possible implementation, the first format b further includes at least one field indicating the specified message, and the specified message includes at least one of channel state information, resource selection assistance information, positioning information, or power control assistance information.

In a possible implementation, the first format b further includes at least one field indicating a period in which the second device feeds back the specified message.

In a possible implementation, the time-frequency resource meets a processing time capability of the second device for the specified message.

In this embodiment of this application, the second device receives the first control information, the second control information, and the data channel that are sent by the first device. The first control information indicates the transmission information of the data channel sent by the first device, the first control information includes the at least one field indicating the format of the second control information, and the first format b of the second control information indicates the time-frequency resource for feeding back the specified message by the second device. When the second control information is in the first format b, the second device sends, to the first device, the specified message, the control information indicating the transmission information of the specified message sent by the second device, and the control information indicating the redundancy version of the specified message sent by the second device, where the specified message occupies the part or all of the time-frequency resource. In this way, the second device feeds back the specified message on the part or all of the reserved time-frequency resource, to ensure timely and successful feedback of the specified message, so as to improve system performance. In addition, when sending the specified message, the second device does not need to select a time-frequency resource through channel contention. This reduces power consumption of the second device.

For various possible implementations or descriptions of the foregoing embodiments, refer to the foregoing descriptions. Details are not described herein again.

An embodiment of this application further provides a communication system. The communication system includes the first device and the second device in any one of the foregoing embodiments. The first device is configured to perform the technical solution shown in FIG. 5, and the second device is configured to perform the technical solution shown in FIG. 5.

An embodiment of this application further provides a communication system. The communication system includes the first device and the second device in any one of the foregoing embodiments. The first device is configured to perform the technical solution shown in FIG. 6, and the second device is configured to perform the technical solution shown in FIG. 6.

Figure 8:
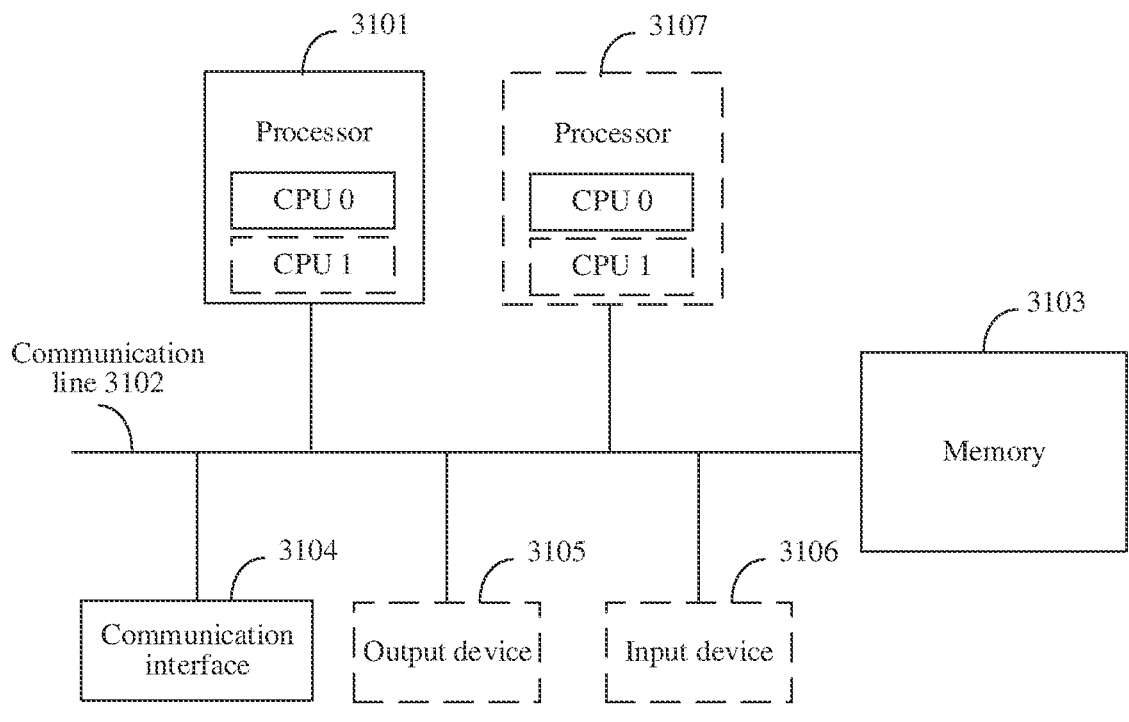
FIG. 8 is a schematic structural diagram of a communication apparatus according to an embodiment of this application.

FIG. 8 is a schematic structural diagram of a communication apparatus according to an embodiment of this application. As shown in FIG. 8, the communication apparatus may include at least one processor 3101, a communication line 3102, a memory 3103, and at least one communication interface 3104.

The processor 3101 may be a general-purpose central processing unit (central processing unit, CPU), a microprocessor, an application-specific integrated circuit (application-specific integrated circuit, ASIC), or one or more integrated circuits configured to control program execution of the solutions in this application.

The communication line 3102 may include a path for transmitting information between the foregoing components.

The communication interface 3104 is any apparatus such as a transceiver, and is configured to communicate with another device or communication network such as the Ethernet, a RAN, or a wireless local area network (wireless local area network, WLAN).

The memory 3103 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 3103 is not limited thereto. The memory may exist independently and is connected to the processor through the communication line 3102. Alternatively, the memory may be integrated with the processor. The memory provided in this embodiment of this application may be usually non-volatile. The memory 3103 is configured to store computer-executable instructions for executing the solutions of this application, and the processor 3101 controls the execution. The processor 3101 is configured to execute the computer-executable instructions stored in the memory 3103, to implement the method provided in the foregoing embodiments of this application.

Optionally, the computer-executable instructions in this embodiment of this application may also be referred to as application program code. This is not specifically limited in this embodiment of this application.

In a specific implementation, in an embodiment, the processor 3101 may include one or more CPUs, for example, a CPU 0 and a CPU 1 in FIG. 8.

In a specific implementation, in an embodiment, the communication apparatus may include a plurality of processors, for example, the processor 3101 and a processor 3107 in FIG. 8. Each of these processors may be a single-core (single-CPU) processor, or may be a multi-core (multi-CPU) processor. The processor herein may be one or more devices, circuits, and/or processing cores configured to process data (for example, computer program instructions).

In a specific implementation, in an embodiment, the communication apparatus may further include an output device 3105 and an input device 3106. The output device 3105 communicates with the processor 3101, and may display information in a plurality of manners. For example, the output device 3105 may be a liquid crystal display (liquid crystal display, LCD), a light-emitting diode (light-emitting diode, LED) display device, a cathode ray tube (cathode ray tube, CRT) display device, or a projector (projector). The input device 3106 communicates with the processor 3101, and may receive an input of a user in a plurality of manners. For example, the input device 3106 may be a mouse, a keyboard, a touchscreen device, a sensing device, or the like.

In an example, with reference to the communication apparatus shown in FIG. 8, the first module 701 and the second module 702 in FIG. 7 may be implemented by the communication interface 3104 and the processor 3101 in FIG. 8. This is not limited in this embodiment of this application.

Figure 9:
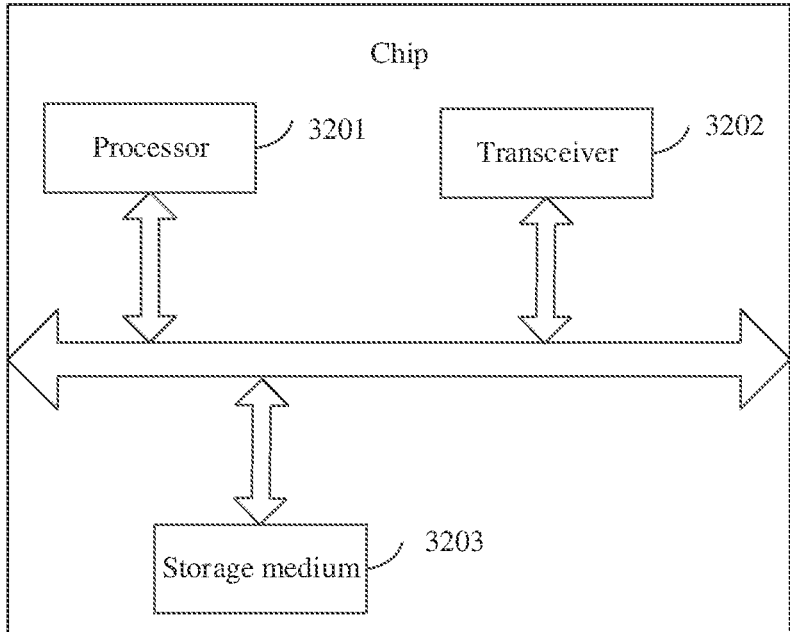
FIG. 9 is a schematic structural diagram of a chip according to an embodiment of this application.

FIG. 9 is a schematic structural diagram of a chip according to an embodiment of this application. As shown in FIG. 9, the chip shown in FIG. 9 may be a general-purpose processor, or may be a dedicated processor. The chip includes a processor 3201. The processor 3201 is configured to support the communication apparatus in performing the technical solution shown in FIG. 5 or FIG. 6.

Optionally, the chip further includes a transceiver 3202. The transceiver 3202 is configured to accept control of the processor 3201, and is configured to support the communication apparatus in performing the foregoing technical solutions. For example, the transceiver 3202 may perform the method shown in FIG. 5 or FIG. 6.

Optionally, the chip shown in FIG. 9 may further include a storage medium 3203.

It should be noted that the chip shown in FIG. 9 may be implemented by the following circuits or components: one or more field programmable gate arrays (field programmable gate arrays, FPGAs), a programmable logic device (programmable logic device, PLD), a controller, a state machine, gate logic, a discrete hardware component, any other suitable circuit, or any combination of circuits that can perform various functions described throughout this application.

An embodiment of this application provides a non-volatile computer-readable storage medium. The non-volatile computer-readable storage medium stores computer program instructions. When the computer program instructions are executed by a processor, the foregoing technical solutions are implemented. For example, the method shown in FIG. 5 or FIG. 6 may be performed.

An embodiment of this application provides a computer program product, including computer-readable code or a non-volatile computer-readable storage medium carrying computer-readable code. When the computer-readable code is run in a processor of an electronic device, the processor in the electronic device performs the foregoing technical solutions. For example, the processor may perform the method shown in FIG. 5 or FIG. 6.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof.

The computer-readable program instructions or code described herein may be downloaded from a computer-readable storage medium to each computing/processing device, or downloaded to an external computer or an external storage device over a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this application may be assembly instructions, instruction set architecture (Instruction Set Architecture, ISA) instructions, machine instructions, machine-related instructions, microcode, firmware instructions, status setting data, or source code or target code written in one or any combination of more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer over any type of network, including a local area network (Local Area Network, LAN) or a wide area network (Wide Area Network, WAN), or may be connected to an external computer (for example, connected by using an Internet service provider over the Internet). In some embodiments, an electronic circuit, for example, a programmable logic circuit, a field programmable gate array (Field Programmable Gate Array, FPGA), or a programmable logic array (Programmable Logic Array, PLA), is customized by using status information of computer-readable program instructions. The electronic circuit may execute the computer-readable program instructions, to implement various aspects of this application.

The various aspects of this application are described herein with reference to the flowcharts and/or the block diagrams of the method, the apparatus (system), and the computer program product according to embodiments of this application. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implements functions/actions specified in one or more blocks in the flowcharts and/or the block diagrams.

The flowcharts and the block diagrams in the appended drawings illustrate system architectures, functions, and operations of possible implementations of apparatuses, systems, methods, and computer program products according to a plurality of embodiments of this application. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an ASIC (Application-Specific Integrated Circuit, application-specific integrated circuit)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, the disclosed content, and the appended claims. In the claims, the word "comprise" (comprising) does not exclude another component or step, and "a" or "one" does not exclude a meaning of plurality. A single processor or another unit may implement several functions enumerated in the claims. Some measures are disclosed in dependent claims that are different from each other, but this does not mean that these measures cannot be combined to produce a good effect.

Embodiments of this application are described above. The foregoing descriptions are examples, are not exhaustive, and are not limited to the disclosed embodiments. Many modifications and changes are apparent to a person of ordinary skill in the art without departing from the scope and spirit of the described embodiments. The selection of terms used in this specification is intended to best explain the principles of the embodiments, practical application, or improvements to technologies in the market, or to enable another person of ordinary skill in the art to understand the embodiments disclosed in this specification.

What is claimed is:

1. A first device, comprising:
at least one processor; and
a non-transitory memory coupled to the at least one processor and storing programming instructions that, when executed by the at least one processor, cause the first device to:
send first control information and second control information to a second device, wherein the first control information comprises at least one of a first field or a second field, the at least one of the first field or the second field indicates a format of the first control information, the at least one of the first field or the second field indicates a format of the second control information, the format of the first control information comprises at least a first format and a second format, the first format indicates a time-frequency resource for feeding back a specified message by the second device, the second format indicates transmission information of a data channel sent by the first device, wherein the format of the second control information comprises at least a third format and a fourth format, the third format indicates a redundancy version of the specified message fed back by the second device, and the fourth format indicates a redundancy version of the data channel sent by the first device; and
receive, based on the first control information being in the first format and the second control information being in the third format, the specified message fed back by the second device on the time-frequency resource,
wherein the third format further comprises at least one field indicating the specified message, wherein the specified message is received from the second device and comprises at least one of resource selection assistance information or power control assistance information.

2. The first device according to claim 1, wherein the first format further comprises at least one field indicating the time-frequency resource.

3. The first device according to claim 1, wherein the specified message further comprises at least one of channel state information (CSI) or positioning information.

4. The first device according to claim 1, wherein the first format further comprises at least one field indicating modulation and coding information and demodulation pilot information that are used when the second device feeds back the specified message.

5. The first device according to claim 1, wherein the first format further comprises at least one field indicating a period in which the second device feeds back the specified message.

6. The first device according to claim 1, wherein the third format further comprises all bits of a source identifier of the first control information and the second control information and all bits of a destination identifier of the first control information and the second control information.

7. The first device according to claim 1, wherein the time-frequency resource meets a processing time capability of the second device for the specified message, the first control information or the second control information comprises sidelink control information (SCI), and the data channel comprises a physical sidelink shared channel (PSSCH).

8. A second device, comprising:
at least one processor; and
a non-transitory memory coupled to the at least one processor and storing programming instructions that, when executed by the at least one processor, cause the second device to:
receive first control information and second control information sent by a first device, wherein the first control information comprises at least one of a first field or a second field, the at least one of the first field or the second field indicates a format of the first control information, the at least one of the first field or the second field indicates a format of the second control information, the format of the first control information comprises at least a first format and a second format, the first format indicates a time-frequency resource for feeding back a specified message by the second device, the second format indicates transmission information of a data channel sent by the first device, the format of the second control information comprises at least a third format and a fourth format, the third format indicates a redundancy version of the specified message fed back by the second device, and the fourth format indicates a redundancy version of the data channel sent by the first device; and
feed back, based on the first control information being in the first format and the second control information being in the third format, the specified message to the first device on the time-frequency resource,
wherein the third format further comprises at least one field indicating the specified message, and wherein the specified message fed back by the second device comprises at least one of resource selection assistance information or power control assistance information.

9. The second device according to claim 8, wherein the first format further comprises at least one field indicating the time-frequency resource.

10. The second device according to claim 8, wherein the specified message comprises at least one of channel state information (CSI) or positioning information.

11. The second device according to claim 8, wherein the first format further comprises at least one field indicating modulation and coding information and demodulation pilot information that are used when the second device feeds back the specified message.

12. The second device according to claim 8, wherein the first format further comprises at least one field indicating a period in which the second device feeds back the specified message.

13. The second device according to claim 8, wherein the third format further comprises all bits of a source identifier of the first control information and the second control information and all bits of a destination identifier of the first control information and the second control information.

14. The second device according to claim 13, wherein the programming instructions further include instructions to:
skip using the time-frequency resource when the destination identifier is different from an identifier of the second device.

15. The second device according to claim 8, wherein the time-frequency resource meets a processing time capability of the second device for the specified message.

16. A first device, comprising:
at least one processor; and
a non-transitory memory coupled to the at least one processor and storing programming instructions that, when executed by the at least one processor, cause the first device to:
send first control information, second control information, and a data channel to a second device, wherein the first control information indicates transmission information of the data channel sent by the first device, the first control information comprises at least one field indicating a format of the second control information, the format of the second control information comprises at least a first format and a second format, the first format indicates a time-frequency resource for feeding back a specified message by the second device, the second format indicates a redundancy version of the data channel sent by the first device; and
receive from the second device, based on the second control information being in the first format, the specified message, receive control information indicating the transmission information of the specified message sent by the second device, and receive control information indicating a redundancy version of the specified message sent by the second device that are sent by the second device, wherein the specified message occupies a part or all of the time-frequency resource,
wherein the first format further comprises at least one field indicating the specified message, wherein the specified message comprises at least one of resource selection assistance information or power control assistance information.

17. The first device according to claim 16, wherein the first format further comprises at least one field indicating the time-frequency resource.

18. The first device according to claim 16, wherein specified message comprises at least one of channel state information (CSI) or positioning information.

19. The first device according to claim 16, wherein the first format further comprises at least one field indicating a period in which the second device feeds back the specified message.

20. The first device according to claim 16, wherein the time-frequency resource meets a processing time capability of the second device for the specified message, the first control information or the second control information comprises sidelink control information (SCI), and the data channel comprises a physical sidelink shared channel (PSSCH).

* * * * *